(12) United States Patent
Vogl

(10) Patent No.: US 11,085,793 B2
(45) Date of Patent: Aug. 10, 2021

(54) INERTIAL MEASUREMENT UNIT AND DIAGNOSTIC SYSTEM

(71) Applicant: Government of the United States of America, as Represented by the Secretary of Commerce, Gaithersburg, MD (US)

(72) Inventor: Gregory Vogl, Gaithersburg, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 926 days.

(21) Appl. No.: 15/692,262

(22) Filed: Aug. 31, 2017

(65) Prior Publication Data
US 2018/0094946 A1    Apr. 5, 2018

Related U.S. Application Data

(60) Provisional application No. 62/403,416, filed on Oct. 3, 2016.

(51) Int. Cl.
*G01P 15/18*    (2013.01)
*G01C 19/5712*  (2012.01)
(Continued)

(52) U.S. Cl.
CPC ......... *G01C 23/00* (2013.01); *G01C 19/5712* (2013.01); *G01P 15/18* (2013.01); *G05B 19/042* (2013.01)

(58) Field of Classification Search
CPC ............................ G01C 19/5712; G01P 15/18
See application file for complete search history.

(56) References Cited

U.S. PATENT DOCUMENTS

| 4,748,554 A  | 5/1988 | Gebauer et al. |
| 6,853,951 B2 | 2/2005 | Jarrell et al. |

(Continued)

OTHER PUBLICATIONS

Uhlmann, E., et al., Monitoring of slowly progressing deterioration of computer numerical control machine axes, Proceedings of the Institution of Mechanical Engineers, Part B: Journal of Engineering Manufacture, 2008, pp. 1213-1219, vol. 222(10).

(Continued)

*Primary Examiner* — Janet L Suglo
(74) *Attorney, Agent, or Firm* — Office of Chief Counsel for National Institute of Standards and Technology

(57) ABSTRACT

A an inertial measurement unit determines performance degradation of a linear axis and includes: an accelerometer that, when disposed on a motion member of the linear axis including the motion member and a base member: measures acceleration of the motion member; and provides a displacement of the motion member in response to movement of the motion member; and a rate gyroscope that: measures an angular rate of movement of the motion member; and provides a yield angle for the motion member in response to movement of the motion member, wherein the displacement and yield angle determine performance degradation of the linear axis based on an error in linear movement of the motion member along the base member.

17 Claims, 29 Drawing Sheets

(51) Int. Cl.
    *G01C 23/00*     (2006.01)
    *G05B 19/042*     (2006.01)

(56) References Cited

U.S. PATENT DOCUMENTS

| | | | |
|---|---|---|---|
| 7,027,953 | B2 | 4/2006 | Klein |
| 8,356,207 | B2 | 1/2013 | Hosek et al. |
| 8,401,691 | B2 | 3/2013 | Smith et al. |
| 9,144,869 | B2 | 9/2015 | Sato et al. |
| 2004/0039478 | A1 | 2/2004 | Kiesel et al. |
| 2006/0191149 | A1* | 8/2006 | Banks .............. G01B 5/008 33/502 |
| 2013/0261987 | A1* | 10/2013 | Grant .............. G01M 13/028 702/39 |
| 2014/0083162 | A1* | 3/2014 | Seewig .............. B24B 5/42 73/1.79 |
| 2017/0231114 | A1 | 8/2017 | Butscher et al. |

OTHER PUBLICATIONS

Liao, L., et al., A novel method for machine performance degradation assessment based on fixed cycle features test, Journal of Sound and Vibration, 2009, pp. 894-908, vol. 326(3-5).

Verl, A., Helsel, U., et al., Sensorless automated condition monitoring for the control of the predictive maintenance of machine tools, CIRP Annals—Manufacturing Technology, 2009, pp. 375-378, vol. 58(1).

Zhou, Z., et al., Integrated condition monitoring and fault diagnosis for modern manufacturing systems, CIRP Annals—Manufacturing Technology, 2000, pp. 387-390, vol. 49(1).

Feng, G.-H., et al., Investigation of ball screw preload variation based on dynamic modeling of a preload adjustable feed-drive system and spectrum analysis of ball-nuts sensed vibration signals, International Journal of Machine Tools and Manufacture, 2012, pp. 85-96, vol. 52(1).

Spiewak, S., et al., High accuracy, low-invasive displacement sensor (HALIDS), ASME 2013 International Mechanical Engineering Congress and Exposition, IMECE 2013, Nov. 15-21, 2013, San Diego, CA, United states.

Liao, L., et al., Machine tool feed axis health monitoring using plug-and- prognose technology, Proceedings of the 2012 Conference of the Society for Machinery Failure Prevention Technology, 2012.

Huang, B., et al., Life prediction of CNC linear rolling guide based on DFNN performance degradation model, 2010 7th International Conference on Fuzzy Systems and Knowledge Discovery, IEEE, Aug. 10-12, 2010, pp. 1310-1314.

Sato, R., et al., Motion trajectory measurments of NC machine tools using accelerometers, International Journal of Automation Technology, 2011, 387-394, 5(3).

* cited by examiner

INERTIAL MEASUREMENT UNIT AND DIAGNOSTIC SYSTEM

CROSS REFERENCE TO RELATED APPLICATIONS

This application claims the benefit of U.S. Provisional Patent Application Ser. No. 62/403,416, filed Oct. 3, 2016, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 16-039US1.

BRIEF DESCRIPTION

Disclosed is an inertial measurement unit to determine a performance degradation of a linear axis, the inertial measurement unit comprising: an accelerometer that, when disposed on a motion member of the linear axis comprising the motion member and a base member: measures acceleration of the motion member; and provides a displacement of the motion member in response to movement of the motion member; and a rate gyroscope that: measures an angular rate of movement of the motion member; and provides a yield angle for the motion member in response to movement of the motion member, wherein the displacement and yield angle determine performance degradation of the linear axis based on an error in linear movement of the motion member along the base member.

Also disclosed is a diagnostic apparatus to determine a performance degradation of a linear axis, the diagnostic apparatus comprising: a linear axis comprising: a base member; a motion member disposed on the base member, the motion member having substantially linear movement with respect to a first direction along the base member prior to performance degradation of the linear axis with respect to movement along the first direction; and an inertial measurement unit disposed on the motion member such that the inertial measurement unit moves with the motion member and comprises: an accelerometer that: measures acceleration of the motion member; and provides a displacement of the motion member in response to movement of the motion member; and a rate gyroscope that: measures an angular rate of movement of the motion member; and provides a yield angle for the motion member in response to movement of the motion member, wherein the displacement and yield angle determine performance degradation of the linear axis based on an error in linear movement of the motion member along the base member.

Further disclosed is a process for diagnosing a geometric performance of a linear axis, the process comprising: providing the diagnostic apparatus; moving the motion member at a first speed in the first direction, the first speed being constant; producing acceleration data by measuring acceleration of the motion member by the accelerometer of the inertial measurement unit; producing angular rate data by measuring the angular rate of the motion member by the rate gyroscope of the inertial measurement unit; integrating the acceleration data to produce the translational displacement data for the movement of the motion member; filtering the translational displacement data to produce filtered translational displacement data versus a travel length of the motion member; integrating the angular rate data to produce angular displacement data for the movement of the motion member; and filtering the angular displacement data to produce filtered angular displacement data to diagnose the geometric performance of a linear axis.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
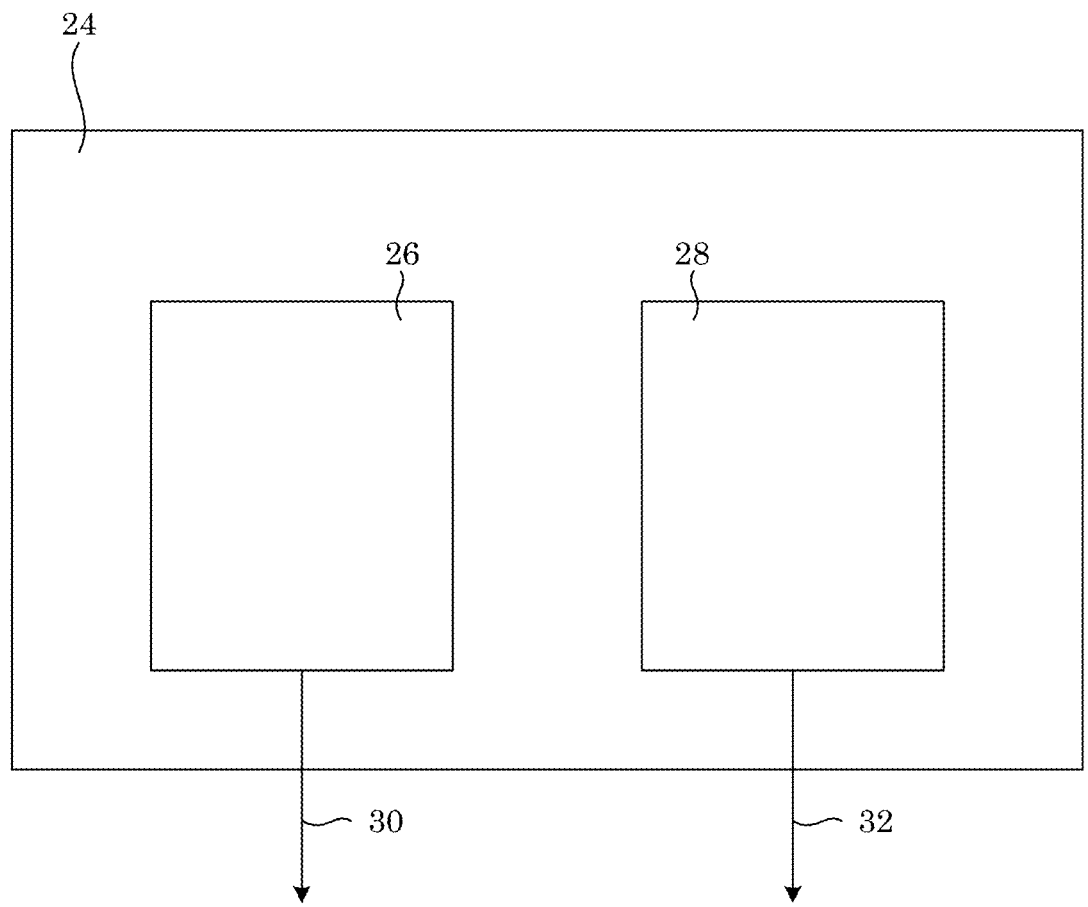
FIG. 1 shows an inertial measurement unit (IMU)

A detailed description of one or more embodiments is presented herein by way of exemplification and not limitation.

Advantageously and unexpectedly, it has been discovered that an inertial measurement unit (IMU) herein provides determination of error in translational and angular geometric errors of a linear axis. A linear axis can be a subsystem of a machine used, e.g., in manufacturing. Linear axes can degrade during a production run, and knowledge of degradation is not acquired or known until a fault or failure occurs that halt production. Beneficially, a process and article includes the IMU and quickly estimates performance degradation of a linear axis without a disruption to production. The process and article combine data collected from the IMU when a motion member of the linear axis is subjected to movement at various axis speeds and determine changes in translational and angular geometric errors of the linear axis due to axis degradation. Moreover, maintenance of a machine tool can include determining axis degradation with the article and process herein.

As a machine tool, e.g., a computer numerical control (CNC) tool such as a lathe or mill, produces machined parts, faults can emerge that lead to performance degradation of the machine tool. The performance degradation lowers control precision and accuracy of the linear axis of the machine tool. Eventually, the linear axis of CNC machines may undergo wear, failure, or loss of production quality. A fault or failure can be common in automation and production during manufacturing. Machine tool faults account for yearly economic losses of tens of billions of US dollars such that practice of embodiments herein provide economic incentives.

Machine tools should be maintained and available for cost-effective production. Embodiments provide accurate detection of degradation performance of the linear axes in contrast to conventional manual procedures that can be time consuming and cost-prohibitive. Indeed, manufacturers typically do not know the condition of the linear axes of their machine tools, and instead react to problems as they occur. Hence, manufacturers need automated and efficient methods for periodic (e.g., daily or weekly) diagnosis of a condition of machine tool linear axes with minimal disruption to production. Uniquely, embodiments provide for periodically measuring linear axis health in a short period, e.g., about 5 minutes.

In an embodiment, a process for condition monitoring of a linear axis include combining data collected from an inertial measurement unit disposed on a linear axis and estimating the linear axes errors due to degradation. Data is collected by the IMU during motion of the linear axis at a plurality (e.g., three) different speeds. Data collection for a linear axis may take as little as 5 minutes. When the IMU moves with a linear axis, performance degradation of the linear axis is determined. Beneficially, determination of performance degradation of the linear axis is used for diagnostics and prognostics to optimize maintenance of the linear axis, e.g., in a machine tool.

Conventional condition monitoring is based on sensing temporal changes in vibrations metrics of accelerometer signals. These methods do not yield linear axis errors, the result of degradation that affects the quality of production parts. On the other hand, conventional methods for measuring linear axis errors are based on laser-, capacitive-, or probe-based metrology equipment but are time- and cost-prohibitive for maintenance of a fleet of production machines. Embodiments of the processes and articles described herein overcome these issues and uniquely acquire sensor data at various speeds, process such data, and combine the data to estimate the linear axis errors.

In an embodiment, with reference to FIG. 1, inertial measurement unit 24 determines a performance degradation of a linear axis and includes accelerometer 28 that, when disposed on a motion member of the linear axis (that includes the motion member disposed on a base member) measures acceleration of the motion member and provides a displacement of the motion member in response to movement of the motion member. Accelerometer 28 produces acceleration data 32 that can be communicated from accelerometer 28. Inertial measurement unit 24 also includes rate gyroscope 26 that measures an angular rate of movement of the motion member and provides a yield angle for the motion member in response to movement of the motion member. Here, rate gyroscope 26 produces angular rate data 30 that can be communicated from rate gyroscope 26. The displacement and yield angle determine performance degradation of the linear axis based on an error in linear movement of the motion member along the base member.

Figure 2:
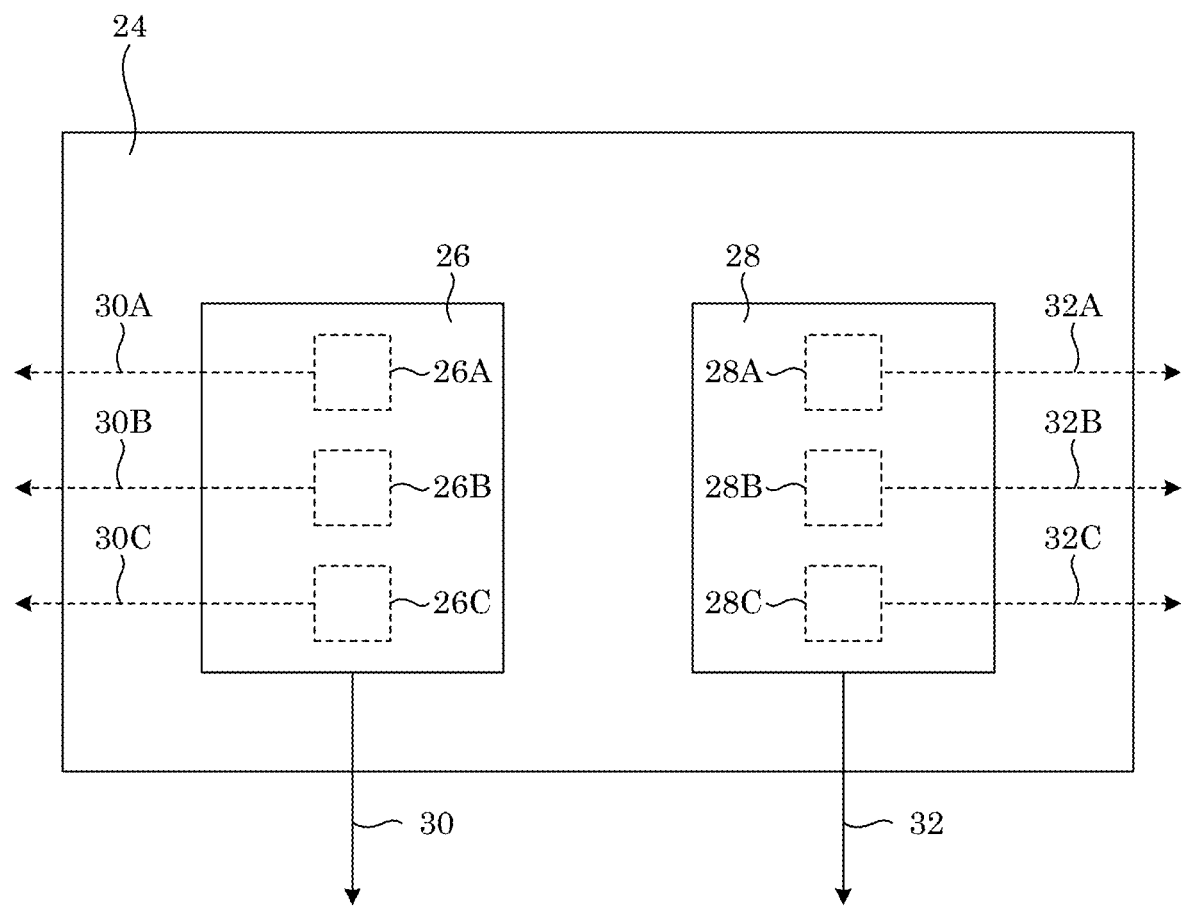
FIG. 2 shows an IMU.

With reference to FIG. 2, inertial measurement unit 24 can include a plurality of accelerometers 28 (e.g., one, two, . . . , 10, or more accelerometers), the plurality of rate gyroscopes 26 (e.g., one, two, . . . , 10, or more rate gyroscopes). In an embodiment, inertial measurement unit 24 includes x-direction gyroscope 28A, y-direction gyroscope 28B, and z-direction gyroscope 28C that provide acceleration data (32A, 32B, 32C). In an embodiment, inertial measurement unit 24 includes x-direction rate gyroscope 26A, y-direction rate gyroscope 26B, and z-direction rate gyroscope 26C that provide angular rate data (30A, 30B, 30C).

According to an embodiment, rate gyroscope 26 can be a monolithic device such as a triaxial rate gyroscope that provides x-, y-, and z-direction angular rate data. In some embodiments, rate gyroscope 26 is a micro-electro-mechanical system (MEMS) device that provides angular rate data 30 at a spatial frequency from 0 Hz (also referred to as a DC response) to a high frequency such as 200 Hz.

According to an embodiment, accelerometer 28 can be a monolithic device such as a triaxial accelerometer that provides x-, y-, and z-direction acceleration data. In some embodiments, accelerometer 28 is a MEMS device that provides acceleration data 32 at a spatial frequency from 0 Hz (also referred to as a DC response) to a high frequency such as 500 Hz.

Figure 3:
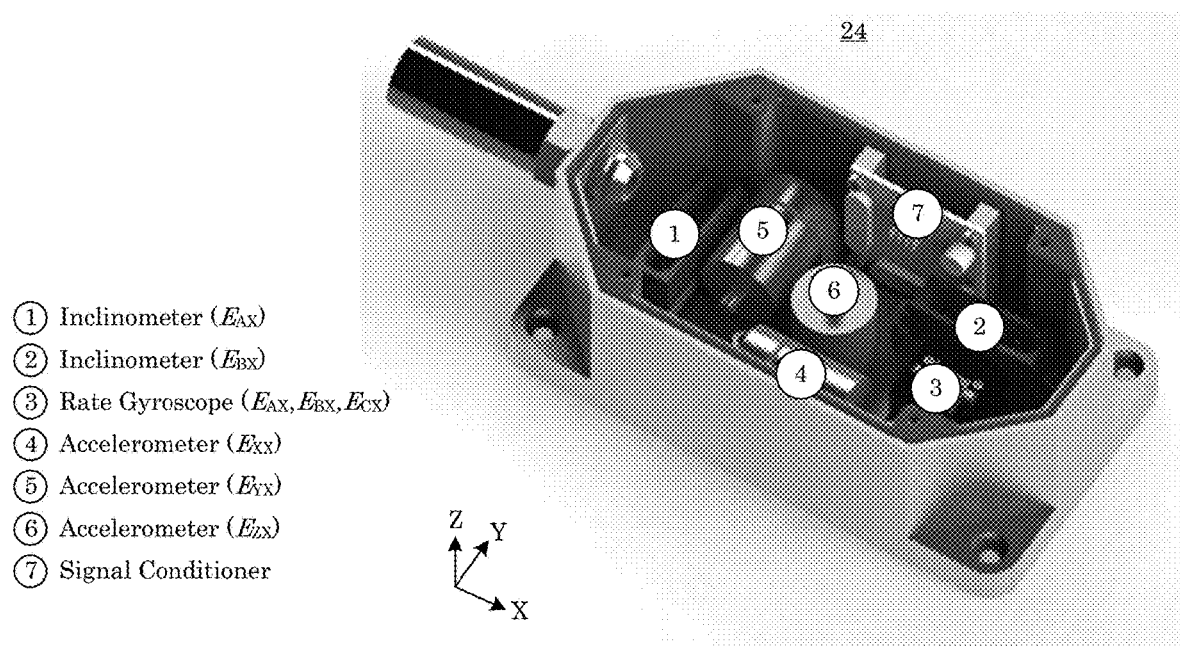
FIG. 3 shows an IMU.
Figure 4:
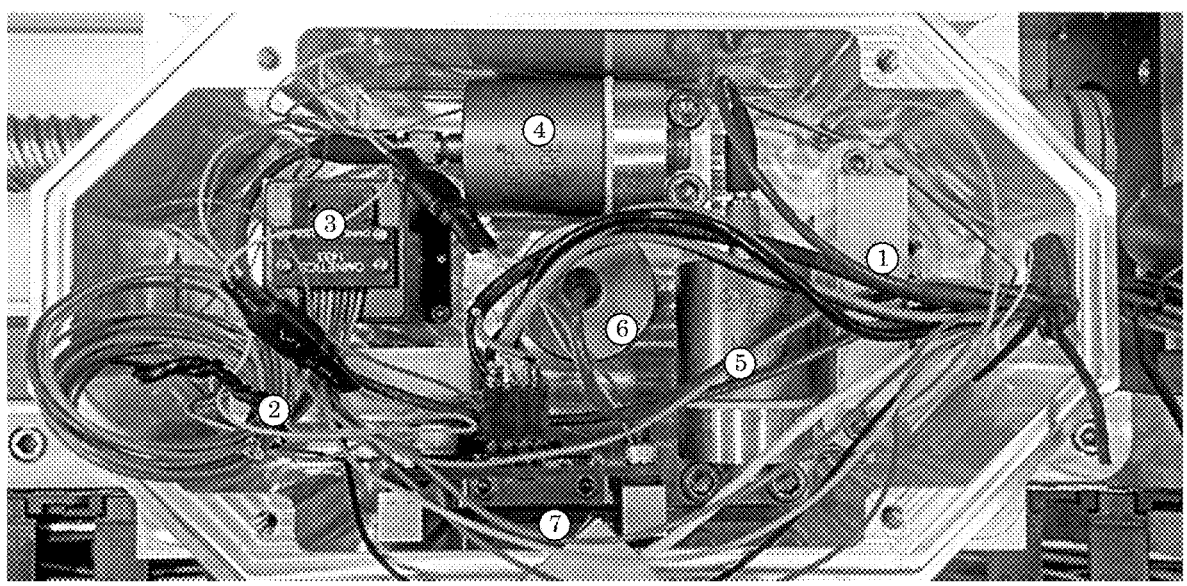
FIG. 4 shows an IMU.

Alternatively, accelerometers 28 or rate gyroscopes 26 can be configured differently. For example, an alternate configuration may use two rate gyroscopes and one accelerometer. In some applications, a level detector such as an inclinometer can be used to measure a local level of inertial measurement unit 24 as shown in FIG. 3 and FIG. 4.

Figure 5:
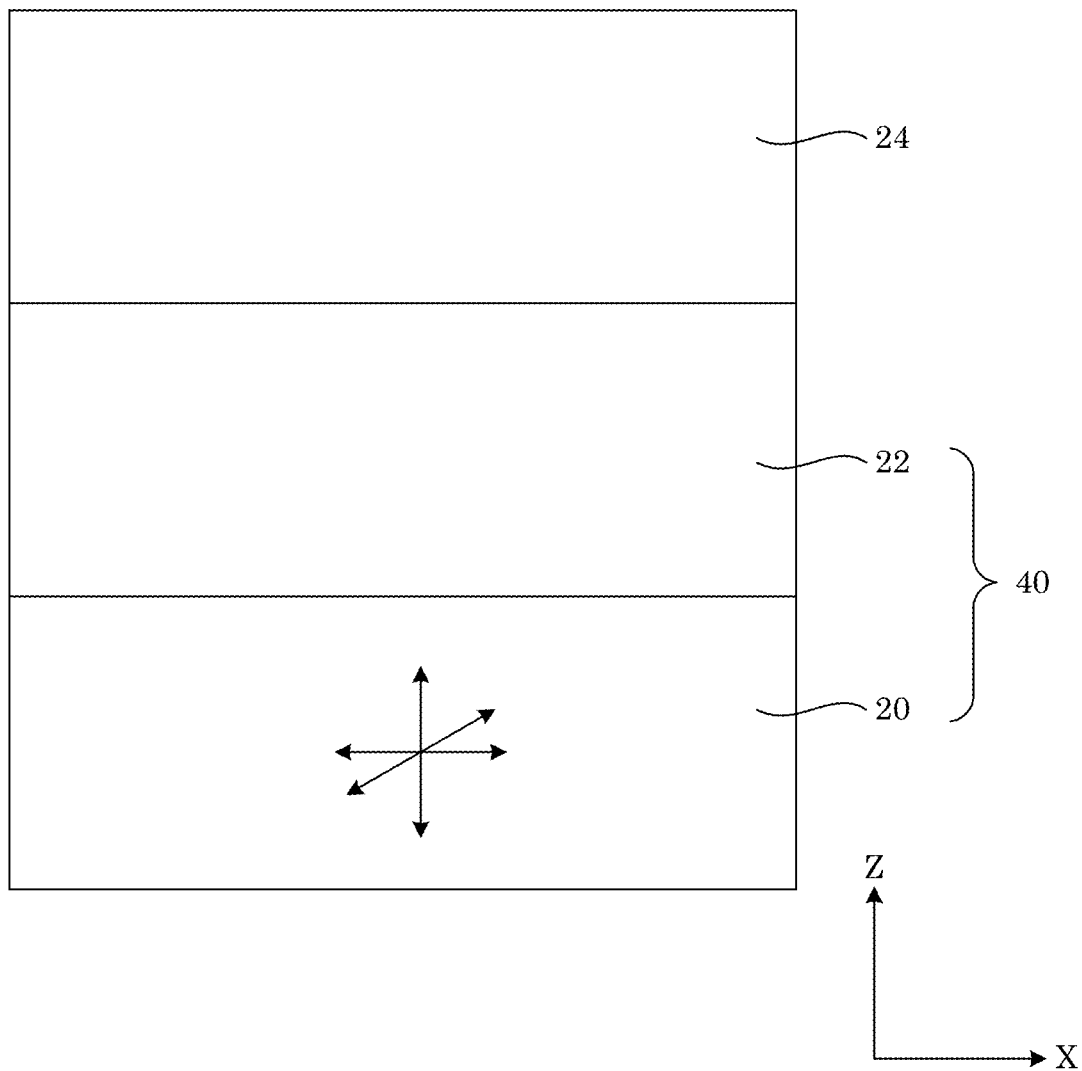
FIG. 5 shows a diagnostic apparatus.

In an embodiment, with reference to FIG. 5, diagnostic apparatus 100 determines a performance degradation of linear axis 40. Here, diagnostic apparatus includes linear axis 40 and inertial measurement unit 24 disposed on linear axis 40. Linear axis 40 includes base member 20 and motion member 22 disposed on base member 20. Motion member 22 has substantially linear movement with respect to a first direction (e.g., the x-direction) along base member 20 prior to performance degradation of linear axis 40 with respect to movement along the first direction. Inertial measurement unit 24 is disposed on motion member 22 such that inertial measurement unit 24 moves with motion member 22. Inertial measurement unit 24 includes accelerometer 28 that measures acceleration of motion member 22 and provides a displacement of motion member 22 in response to movement of motion member 22; and rate gyroscope 26 that measures an angular rate of movement of motion member 22 and provides a yield angle for motion member 22 in response to movement of motion member 22. The displacement and yield angle acquired by inertial measurement unit 24 determines performance degradation of linear axis 40 based on an error in linear movement of motion member 22 along base member 20.

Figure 6:
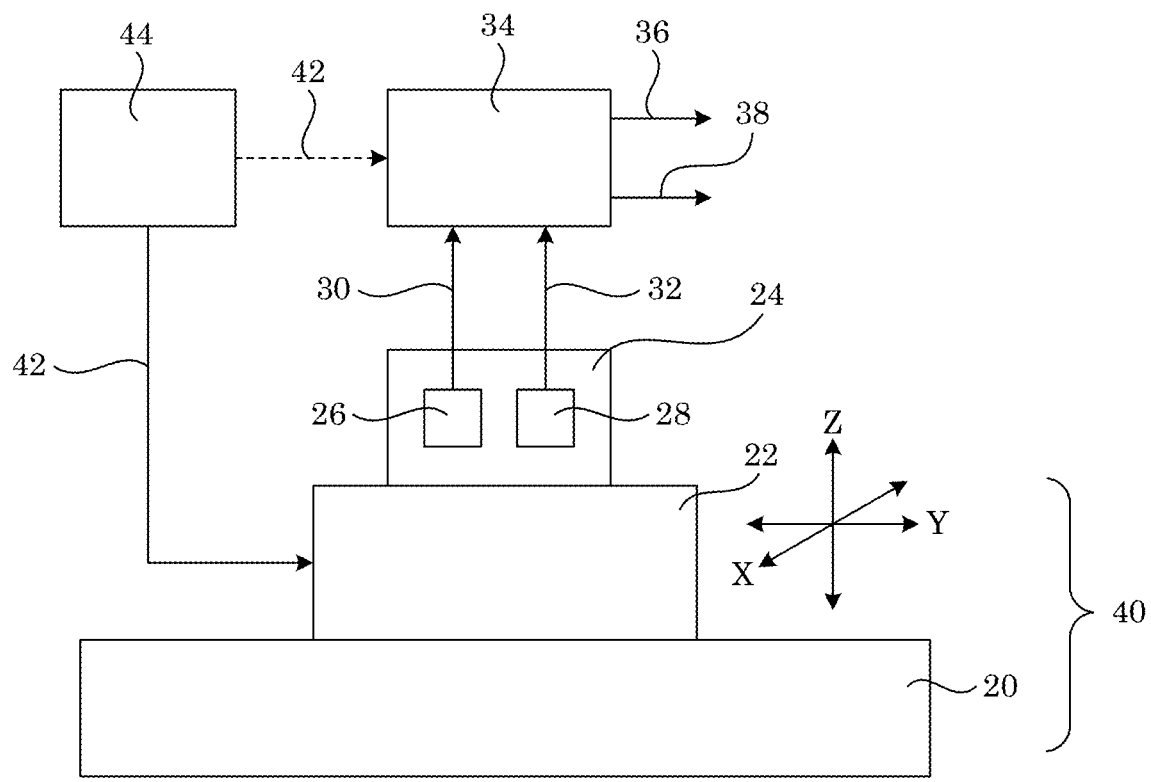
FIG. 6 shows a diagnostic apparatus.

With reference to FIG. 6, it is contemplated that in diagnostic apparatus 100, accelerometer 28 produces acceleration data 32 for motion member 22, and rate gyroscope 26 produces angular rate data 30 for motion member 22. Also, inertial measurement unit 24 produces inertial data that includes acceleration data 32 and angular rate data 30. Moreover, diagnostic apparatus 100 further can include analyzer 34 that receives inertial data, i.e., acceleration data 32 from accelerometer 28 and angular rate data 30 from rate gyroscope 26, produces straightness error 38 based on acceleration data 32, and produces angular error 36 based on angular rate data 30.

Further, diagnostic apparatus 100 can include movement controller 44 in communication (e.g., in electrical communication, in mechanical communication, or a combination thereof) with motion member 22. Movement controller 44 controls movement of motion member 22 in the first direction via control signal 42 communicated from movement controller 44 to motion member 22. Analyzer 34 can also receive control signal 42 from movement controller 44 so that inertial data (30, 32) from inertial measurement unit 24 can be simulated or compared to movement of motion member 22. It should be appreciated that inertia data is produced by inertial measurement unit 24 independently of control of movement of motion member 22 in the first direction by movement controller 44.

In an embodiment, diagnostic apparatus 100 includes a machine tool that includes linear axis 40, wherein motion member 22 and base member 20 in combination provide movement of a cutting tool (e.g., an end mill, a fly cutter, and the like) or a workpiece disposed on motion member 22. Here, movement controller 44 controls movement of the machine tool and motion member 22 in the first direction such that inertia data is produced by inertial measurement unit 24 independently of control of movement of motion member 22 in the first direction by movement controller 44. It is contemplated that movement controller 44 controls movement of motion member 22 at a fast speed and a slow speed such that: accelerometer 28 provides a low spatial frequency of translational motion of motion member 22 at the fast speed, and accelerometer 28 provides a high spatial frequency of translation motion of motion member 22 at the low speed. Also, rate gyroscope 26 provides a low spatial frequency of angular motion of motion member 22 at the fast speed, and rate gyroscope 26 provides a high spatial frequency of angular motion of motion member 22 at the low speed.

Figure 7:
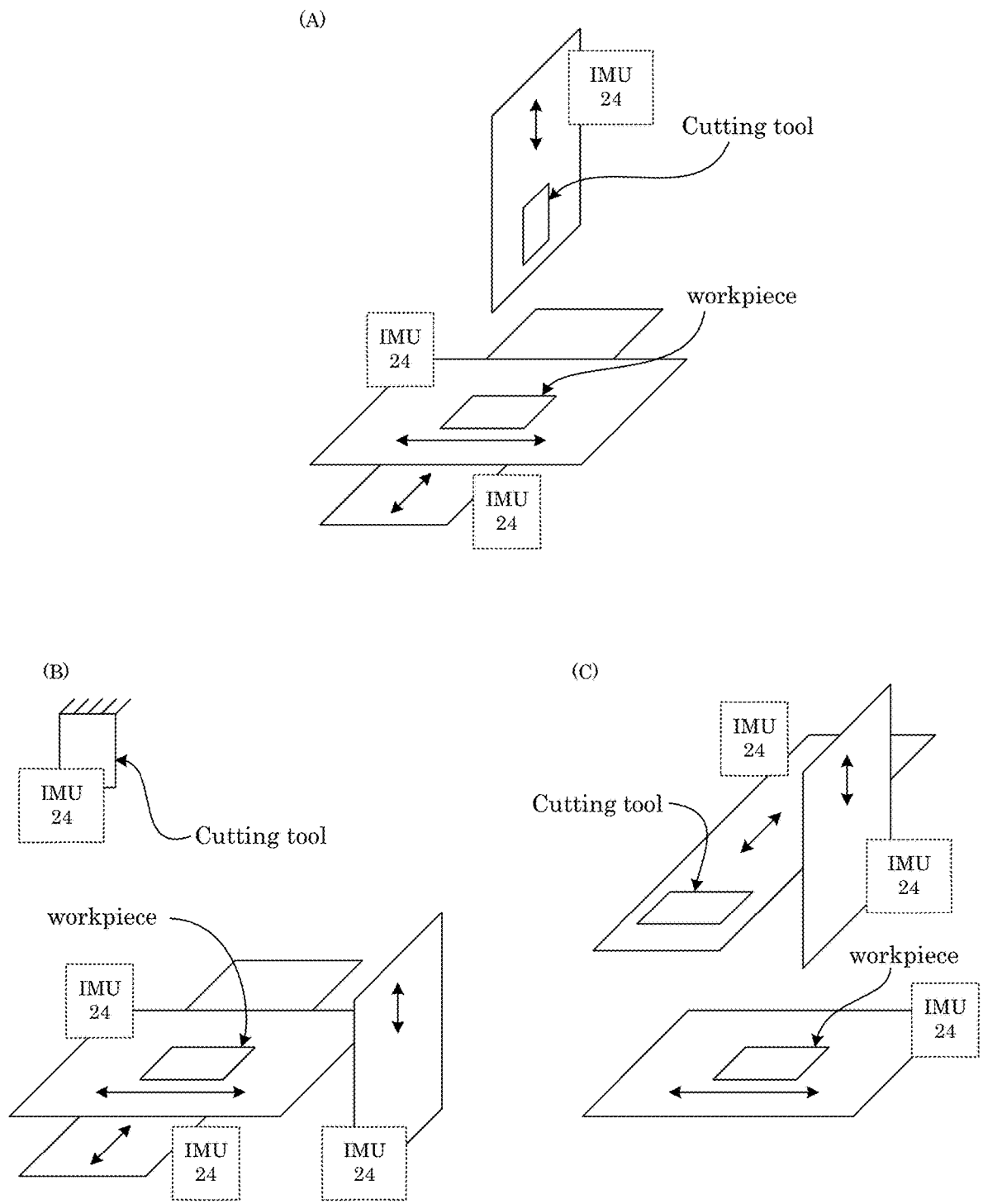
FIG. 7 shows a plurality of configurations and motions of a linear axis in machine tools.

With reference to FIG. 7, inertial measurement unit 24 can be disposed on a linear axis or another part of a machine tool such as a cutting tool. Here, the cutting tool and workpiece can be on different stacked (or unstacked) linear axes, or even not on a linear axis. In this manner, IMU 24 (or a plurality of IMUs 24) can be used to measure the motion of the cutting tool or workpiece. It should be appreciated that IMU 24 can be disposed on any of the linear axes, cutting tool, or any combination thereof. Accordingly, a plurality of IMUs 24 can be disposed on these various components In an embodiment, a process for making inertial measurement unit 24 includes attaching of accelerometers 28 and rate gyroscopes 26 to a housing or enclosure, wherein such attaching can occur via a temporary or permanent bonding material such as a screw, thread locker, adhesive (e.g., an epoxy), and the like. A housing for inertial measurement unit 24 can be rigid and provide fixed locations of sensors (28, 26, and the like) with respect to motion member 22. An aluminum-based alloy or a material with sufficiently high stiffness-to-weight ratio be the material for the housing. Also, the housing can be as monolithic as possible to maximize its rigidity. In an embodiment, the housing contains holes for screws to fasten motion member 22 to the housing.

According to an embodiment, a process for diagnosing a geometric performance of linear axis 40 includes: providing diagnostic apparatus 100; moving motion member 22 at a first speed in the first direction, the first speed being constant; producing acceleration data 32 by measuring acceleration of motion member 22 by accelerometer 28 of inertial measurement unit 24; producing angular rate data 30 by measuring the angular rate of motion member 22 by rate gyroscope 26 of inertial measurement unit 24; integrating acceleration data 32 to produce the translational displacement data for the movement of motion member 22; filtering the translational displacement data to produce filtered translational displacement data versus a travel length of motion member 22; integrating angular rate data 30 to produce angular displacement data for the movement of motion member 22; and filtering the angular displacement data to produce filtered angular displacement data to diagnose the geometric performance of linear axis 40.

The process for diagnosing the geometric performance, further can include moving motion member 22 at a second speed in the first direction, wherein the second speed is constant, and the second speed is different than the first speed. Here, with respect to moving motion member 22 at the second speed, the process can include: producing second acceleration data 28B by measuring acceleration of motion member 22 by accelerometer 28 of inertial measurement unit 24; producing second angular rate data 30B by measuring the angular rate of motion member 22 by rate gyroscope 26 of inertial measurement unit 24; integrating second acceleration data 32B to produce second translational displacement data for the movement of motion member 22; filtering the second translational displacement data to produce second filtered translational displacement data versus a travel length of motion member 22; integrating second angular rate data 30B to produce second angular displacement data for the movement of motion member 22; and filtering the second angular displacement data to produce second filtered angular displacement data; summing the second filtered translational displacement data with the second filtered translational displacement data to produce a plurality of straightness errors; and summing the second filtered angular displacement data with the second filtered angular displacement data to produce a plurality of angular errors.

In the process, moving motion member 22 at a first speed in the first direction includes accelerating the motion member 22 from rest at one end of its travel, maintaining motion of the motion member 22 at the first speed, and decelerating the motion member 22 to rest at its other end of travel. The machine tool performs these steps according to its control system.

Producing acceleration data 32 by measuring acceleration of motion member 22 by accelerometer 28 of inertial measurement unit 24 includes measurements within five subsequent phases of motion described in the prior paragraph such as before motion, during acceleration, during motion at first speed, during deceleration, after motion. The measurements can be collected by a data acquisition unit at a sufficiently high sampling rate and timestamped to a system clock used for all measurements of the inertial measurement unit 24.

Producing angular rate data 30 by measuring the angular rate of motion member 22 by rate gyroscope 26 of inertial measurement unit 24 includes measurements within five subsequent phases of motion such as before motion, during acceleration, during motion at first speed, during deceleration, after motion. The measurements can be collected by a data acquisition unit at a sufficiently high sampling rate and timestamped to a system clock used for all measurements of the inertial measurement unit 24.

Integrating acceleration data 32 to produce the translational displacement data for the movement of motion member 22 includes removal of sensor data offsets, drift, or inclination-related terms, and double integration of the resulting time-based function to produce a time-based translational displacement data function.

Filtering the translational displacement data to produce filtered translational displacement data versus a travel length of motion member 22 includes filtering the translational displacement data function with a phase-preserving bandpass filter, and relating the translational displacements to position of the motion member 22 via use of a position versus time function. Position versus time may be known either through data collected from the controller of the linear axis 40 or approximated via use of acceleration data 32 in the direction of motion.

Integrating angular rate data 30 to produce angular displacement data for the movement of motion member 22 includes removal of sensor data offsets and drift and single integration of the resulting time-based function to produce a time-based angular displacement data function.

Filtering the angular displacement data to produce filtered angular displacement data to diagnose the geometric performance of linear axis 40 includes filtering the angular displacement data function with a phase-preserving bandpass filter, and relating the angular displacements to position of the motion member 22 via use of a position versus time function. Position versus time may be known either through data collected from the controller of the linear axis 40 or approximated via use of acceleration data 32 in the direction of motion.

Moving motion member 22 at a second speed in the first direction includes accelerating the motion member 22 from rest at one end of its travel, maintaining motion of the motion member 22 at the second speed, and decelerating the motion member 22 to rest at its other end of travel. The machine tool performs these steps according to its control system.

Producing second acceleration data 28B by measuring acceleration of motion member 22 by accelerometer 28 of inertial measurement unit 24 includes measurements within five subsequent phases of motion including before motion, during acceleration, during motion at second speed, during deceleration, after motion. The measurements should be collected by a data acquisition unit at a sufficiently high sampling rate and timestamped to a system clock used for all measurements of the inertial measurement unit 24.

Producing second angular rate data 30B by measuring the angular rate of motion member 22 by rate gyroscope 26 of inertial measurement unit 24 includes measurements within five subsequent phases of motion including before motion, during acceleration, during motion at second speed, during deceleration, after motion. The measurements should be collected by a data acquisition unit at a sufficiently high sampling rate and timestamped to a system clock used for all measurements of the inertial measurement unit 24.

Integrating second acceleration data 32B to produce second translational displacement data for the movement of motion member 22 includes removal of sensor data offsets, drift, or inclination-related terms, and double integration of the resulting time-based function to produce a time-based translational displacement data function Filtering the second translational displacement data to produce second filtered translational displacement data versus a travel length of motion member 22 includes filtering the translational displacement data function with a phase-preserving bandpass filter, and relating the translational displacements to position of the motion member 22 via use of a position versus time function. Position versus time may be known either through data collected from the controller of the linear axis 40 or approximated via use of acceleration data 32 in the direction of motion.

Integrating second angular rate data 30B to produce second angular displacement data for the movement of motion member 22 includes removal of sensor data offsets and drift, and single integration of the resulting time-based function to produce a time-based angular displacement data function Filtering the second angular displacement data to produce second filtered angular displacement data includes filtering the angular displacement data function with a phase-preserving bandpass filter, and relating the angular displacements to position of the motion member 22 via use of a position versus time function. Position versus time may be known either through data collected from the controller of the linear axis 40 or approximated via use of acceleration data 32 in the direction of motion.

Summing the second filtered translational displacement data with the second filtered translational displacement data to produce a plurality of straightness errors includes summing the results of filtering the translational displacement data and filtering the second translational displacement data, yielding a translational error as a function of position of the motion member 22.

Summing the second filtered angular displacement data with the second filtered angular displacement data to produce a plurality of angular errors includes summing the results of filtering the angular dispalcement data and filtering the second angular displacememtn data, yielding an angular error as a function of position of the motion member 22.

Figure 8:
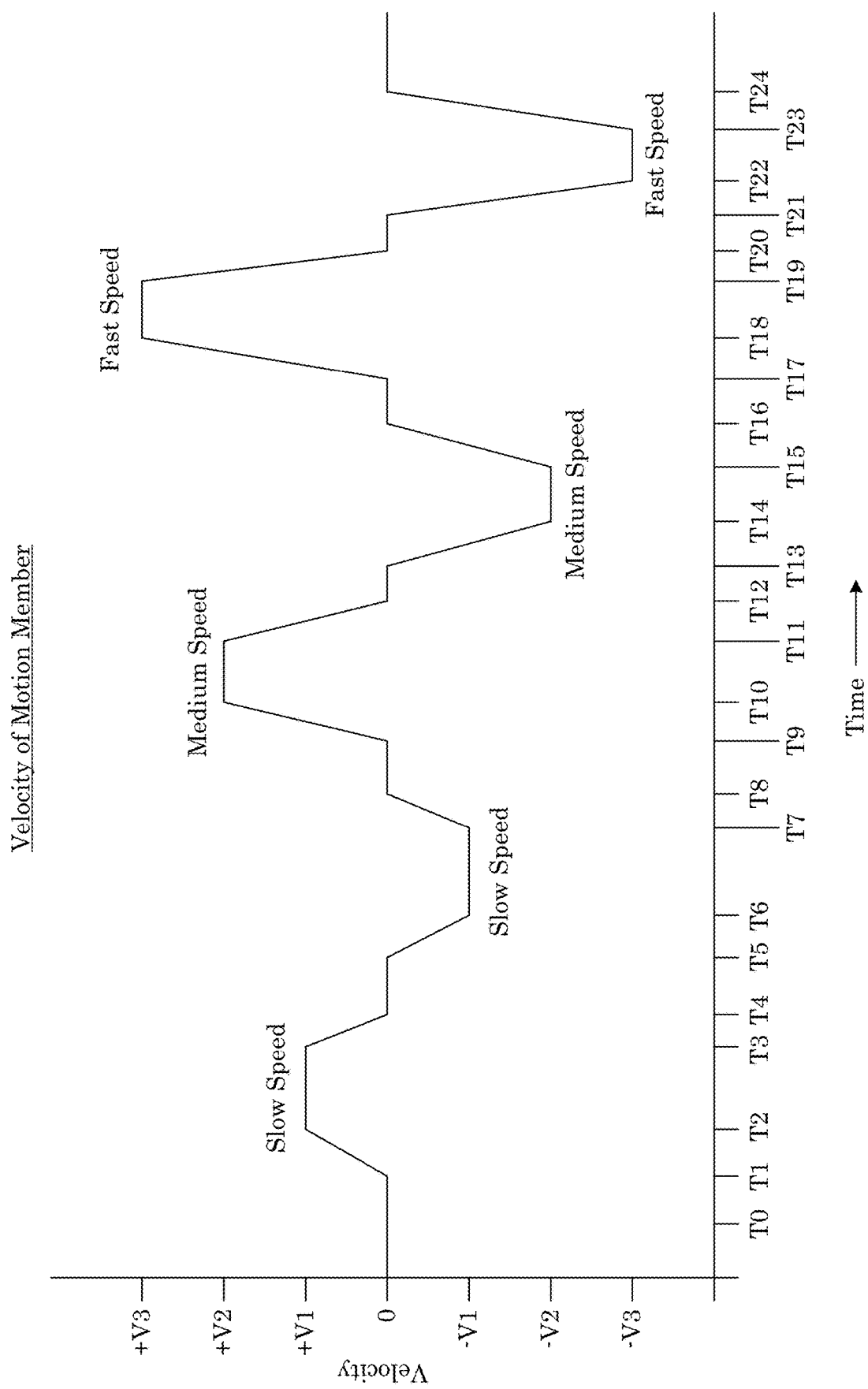
FIG. 8 shows a graph of velocity versus time.
Figure 9:
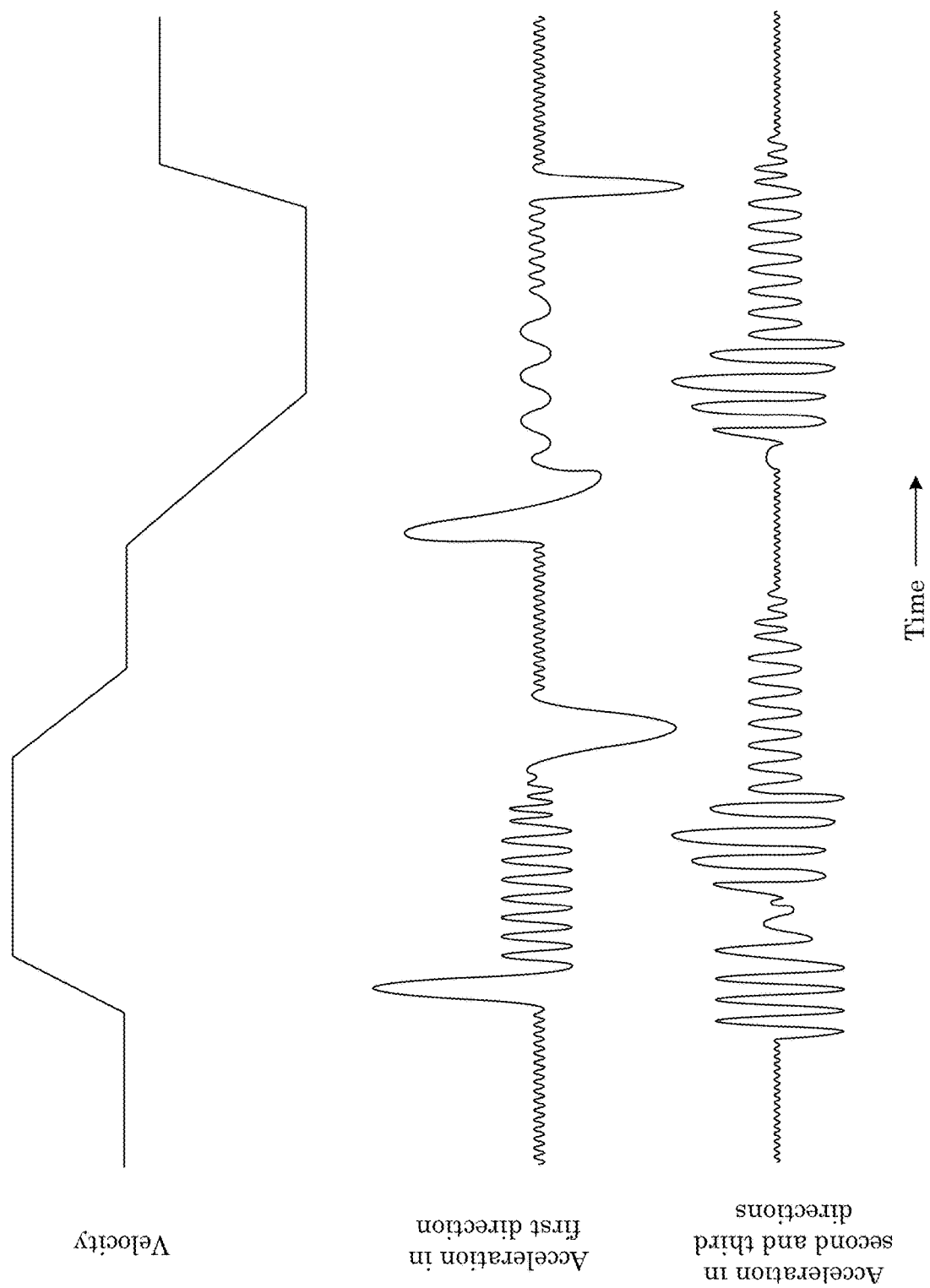
FIG. 9 shows graphs of velocity versus time and acceleration versus time.
Figure 10:
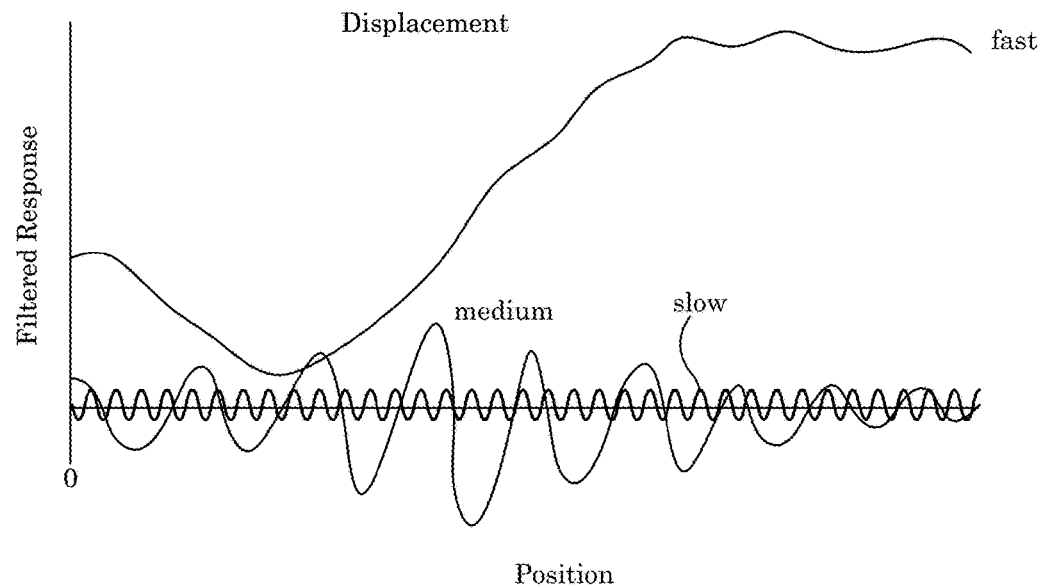
FIG. 10 shows a graph of displacement in panel A and a graph of error versus position in panel B.
Figure 10:
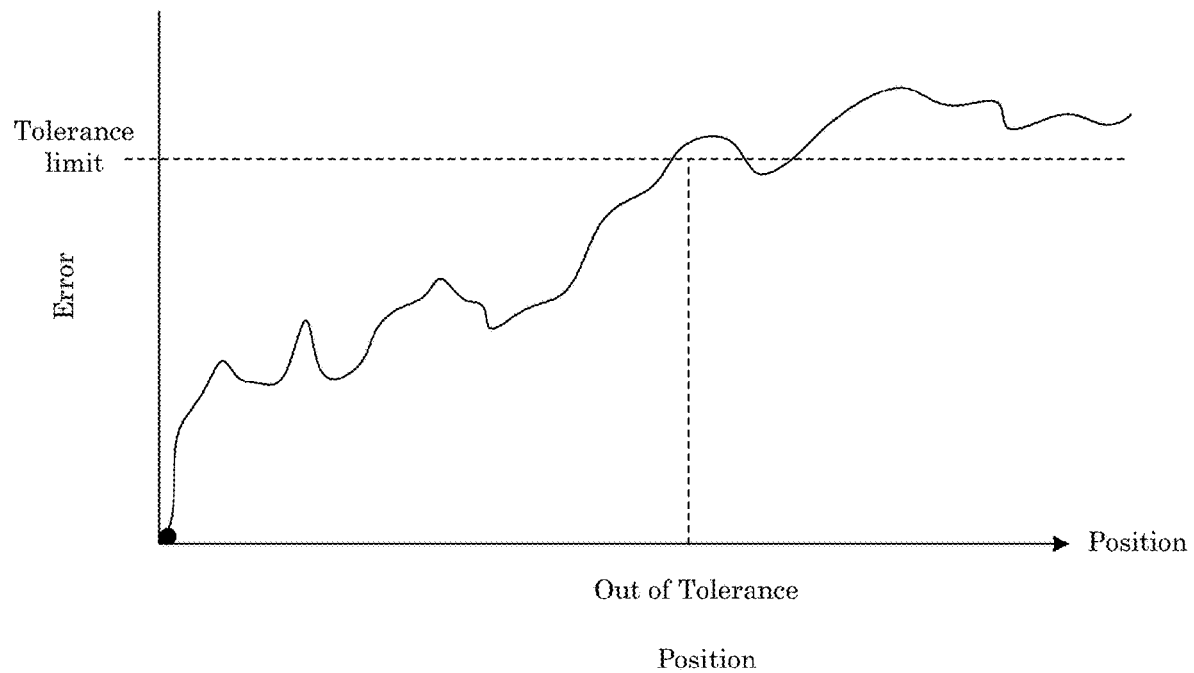

In the process that includes the first speed and second speed, it should be appreciated that a plurality of speeds can be incorporated in the process as illustrated in FIG. 8 that shows a graph of velocity of motion member 22 versus time. Here, motion member 22 is subjected to: a slow speed from time T2 to time T3 in the first direction (e.g., the +x-direction), the slow speed in the opposite direction (−x-direction) of the first direction from time T6 time T7, a medium speed from time T10 to time T11 in the first direction, the medium speed in the opposite direction from time T14 time T15, and a fast speed from time T18 to time T19 in the first direction, the fast speed in the second direction from time T22 time T23. During these periods, accelerometer 28 and rate gyroscope 26 monitor motion member 22 and produce acceleration data 32 and angular rate data 30. As shown in FIG. 9, acceleration data 32A in the x-direction of motion member 22 and velocity in the x-direction are graphed versus time in the upper graph. The lower graph shows acceleration data 32B in a second direction (orthogonal to the first direction; e.g., in the y-direction or z-direction) of motion member 22 and velocity versus time. Moreover, a graph of filtered response versus position (e.g., a travel length L) is shown in the upper panel of FIG. 10 for the fast speed, medium speed, and slow speed of motion member 22 for exemplary data. The lower panel of FIG. 10 shows a graph of error versus position for motion member 22 for a summation of filtered response data with a tolerance limit shown as a dashed for the online, and a dashed vertical line shows when the linear axis has become out of tolerance. Being out of tolerance is a flag for maintenance of the linear axis.

Figure 11:
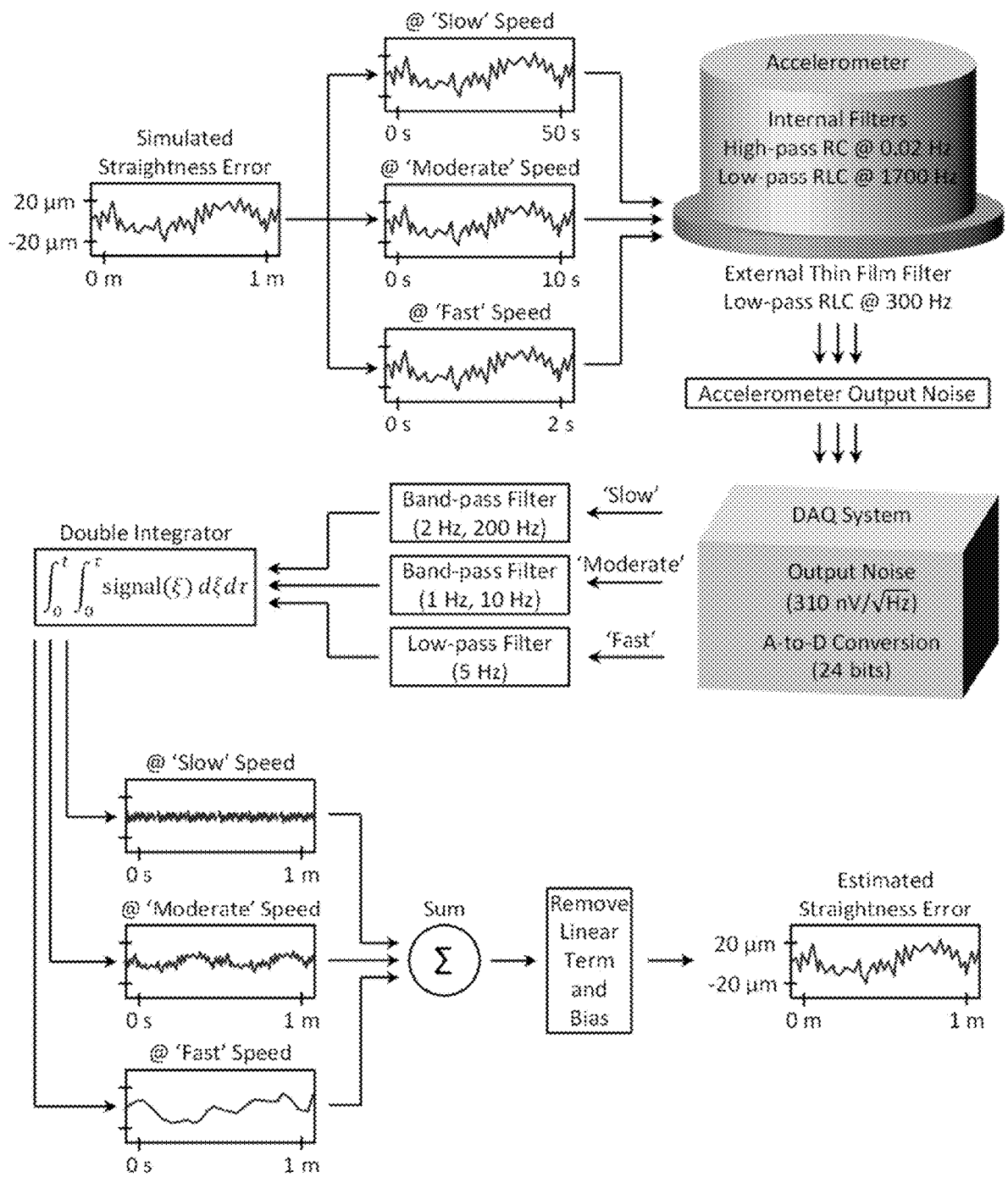
FIG. 11 shows a process for determining error.

FIG. 11 shows a graphical summary of data collection and processing of acceleration data 32 from accelerometer 28 to provide an error in straightness of movement of motion member 22 of linear axis 40.

Inertial measurement unit 24, diagnostic apparatus 100, and processes herein have numerous advantageous and beneficial properties. Advantageously, inertial measurement unit 24 and diagnostic apparatus 100 is potentially significantly cheaper than ballbar-based or laser-based systems for measuring error motions within machine tools. Also, inertial measurement unit 24 and diagnostic apparatus 100 provides error motion data without requiring a setup change on the linear axis 40, in contrast to ballbar-based or laser-based systems. Moreover, inertial measurement unit 24, diagnostic apparatus 100, and processes provide 6 degree-of-freedom error motions, in contrast to ballbar-based systems. Further, inertial measurement unit 24 can be integrated within a linear axis 40, in contrast to ballbar-based or laser-based systems. Fourth also, because the invention described herein can be integrated within linear axis 40 and allows for data collection with setup change of the linear axis 40, the invention described herein can allow for periodic measurements of linear axis 40 for error motion tracking and health management of linear axis 40.

The articles and processes herein are illustrated further by the following Examples, which are non-limiting.

EXAMPLES

Example 1. Identification of Machine Tool Geometric Performance Using On-Machine Inertial Measurements Machine tools degrade during operations, yet accurately detecting degradation of machine components such as linear axes is typically a manual and time-consuming process. Thus, manufacturers need automated and efficient methods to diagnose the condition of their machine tool linear axes with minimal disruptions to production. Towards this goal, a method was developed to use accelerometer and rate gyroscope data from an inertial measurement unit (IMU) for identification of changes in the translational and angular errors due to axis degradation. An IMU was created for application of the method on a machine tool. As a proof of concept for detection of translational error motions, IMU data was collected on a machine tool with experimentally simulated degradation; as the worktable moved along its nominal path, a cross-axis moved along a swept sinusoidal pattern with micrometer-level amplitudes. In another experiment, data was collected at three different locations on a worktable for the same axis motion. These experiments showed that the IMU detected micrometer-level and microradian-level degradation of linear axes, revealing that the IMU-based method is plausible for use in smart machine tools.

Over a machine tool's lifetime, various faults lead to performance degradation, lowering accuracy and repeatability. Typical sources of errors within linear axes are due to pitting, wear, corrosion, and cracks of the system components such as guideways and recirculating balls. A typical machine tool has multiple linear axes, and their accuracies directly impact the quality of manufactured parts. As degradation increases, tool-to-workpiece errors increase that eventually may result in a loss of production quality or a failure. Yet knowledge of degradation is elusive; proper assessment of axis degradation is often a manual, time-consuming, and potentially cost-prohibitive process.

An online condition monitoring system for linear axes is needed to help reduce machine downtime, increase productivity and product quality, and improve knowledge about manufacturing processes. Previous attempts at condition monitoring of linear axes had limited success, partly because of the lack of robustness and defined relationships of signals to axis degradation composed of a wide range of spatial frequencies. Consequently, efficient quantitative measures are needed to monitor the degradation of linear axes.

Figure 12:
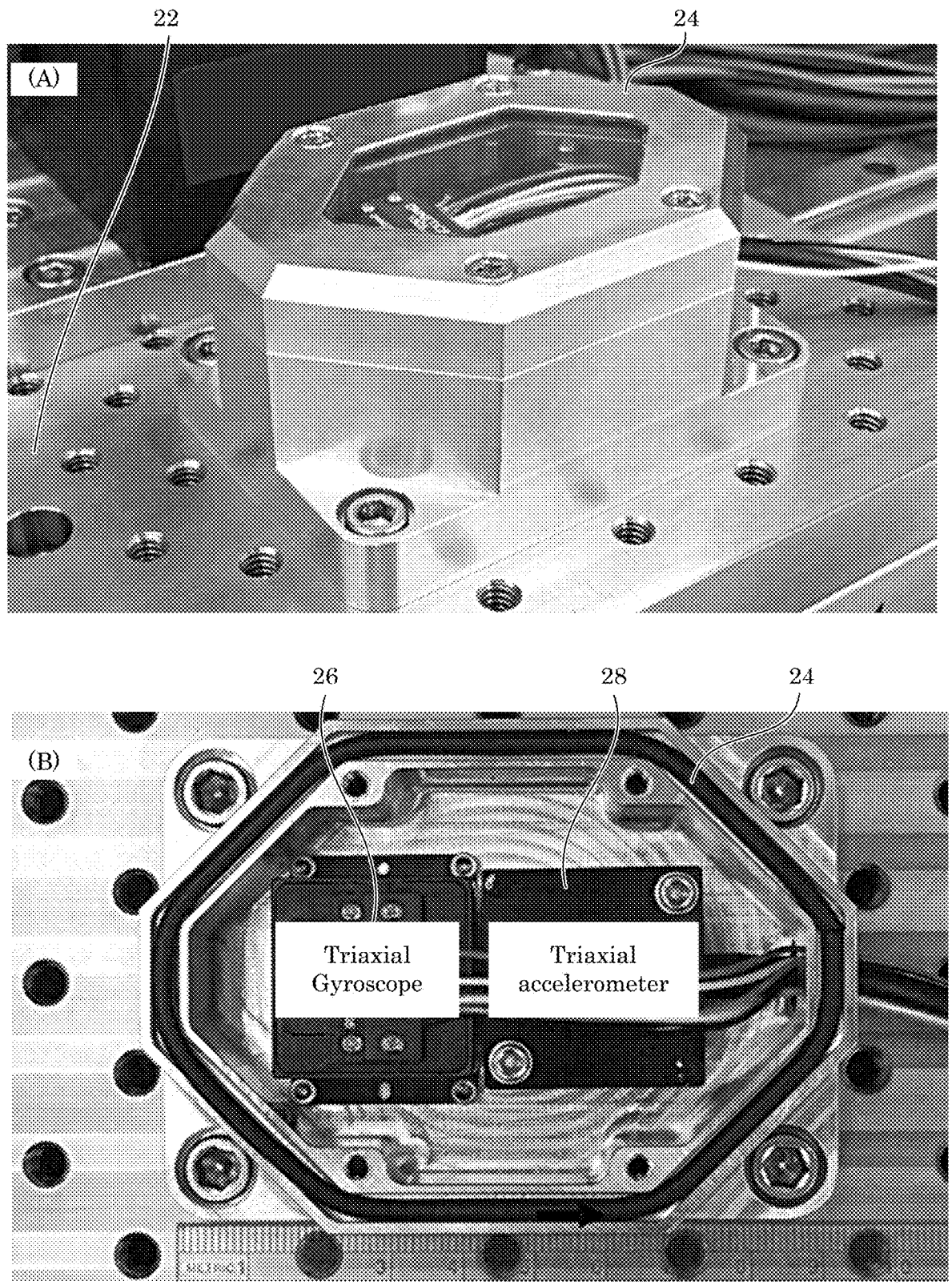
FIG. 12 shows an isometric view of IMU in panel A and a top view of the IMU without its lid in panel B.

For online monitoring of linear axis degradation, an inertial measurement unit (IMU) processes accelerometer and rate gyroscope data to detect changes in the translational and angular error motions due to axis degradation. For industrial application, the IMU can be physically small and economical while satisfying measurement needs. As seen in FIG. 12, an industrial IMU was created that is about 9 cm long and contains a triaxial accelerometer and a triaxial rate gyroscope. The bandwidths and noise properties of these sensors are shown in Table 1. An IMU was made to satisfy design constraints such as cost, size, and accuracy.

TABLE 1

| Accelerometer | 0 Hz to 500 Hz | 20 $(\mu m/s^2)/\sqrt{Hz}$ |
|---|---|---|
| Rate Gyroscope | 0 Hz to 200 Hz | 35 $(\mu rad/s)/\sqrt{Hz}$ |

$^a$frequencies correspond to half-power points, also known as 3 dB points

Detection of Translational Degradation.

Figure 13:
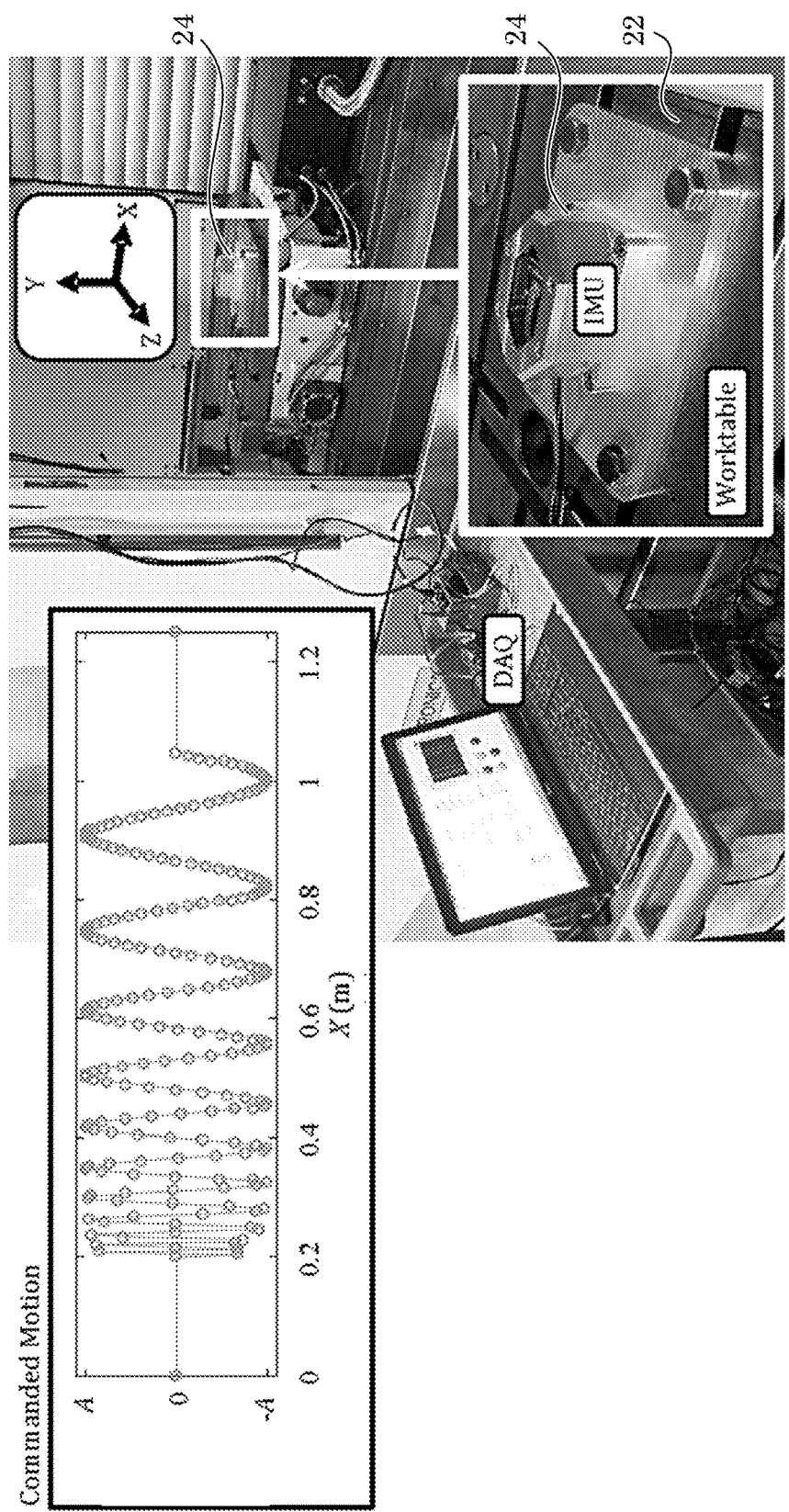
FIG. 13 shows an experimental setup of an IMU disposed on a machine tool and a commanded machine tool motion (Z versus X) in an inset.

Repeated testing of the IMU on a machine tool is performed for acceptance testing. FIG. 13 shows an experimental setup of the IMU on a horizontal milling machine. The IMU is attached to the worktable, which can translate in two directions since the X-axis is stacked on the Z-axis. Of course, unwanted translational errors exist and can worsen due to degradation as the machine tool produces parts. For example, the error motion $E_{ZX}$ is the translational error, as a function of X, in the Z-direction for X-axis motion. Because the X- and Z-axes are stacked for the machine tool, we can simulate $E_{ZX}$ via two-axis commanded motion. The boxed inset of FIG. 13 shows the points used for machine path generation. As the X-axis moves from 0 mm to 1250 mm, the Z-axis experiences a swept-sine-like form of degradation with magnitude A. The path is independent of feed rate, which can be as large as 10 m/min (0.1667 m/s). Hence, data was collected for 50 runs for each of three speeds for use within the method: 0.1667 m/s (Fast speed), 0.1 m/s (Moderate speed), and 0.02 m/s (Slow speed). The fast speed of 0.1667 m/s was the machine limit, but preferably a speed of 0.5 m/s would have been used otherwise. Furthermore, the magnitude A was changed to represent different levels of degradation. Data was collected for five values of A: 0 $\mu m$ (representing no degradation), 5 $\mu m$, 10 $\mu m$, 15 $\mu m$, and 20 $\mu m$ (representing significant degradation). Consequently, the swept-sine-like motion is a "mechanically-simulated degradation" that will test the ability of the industrial IMU to measure micrometer-level degradation for various spatial frequencies.

IMU data (i.e., inertial data including acceleration data and angular rate data) was collected and processed for each of the five values of A, the parameter representing translational error motion in the Z-direction due to 'degradation'. The results of each set of 50 runs were averaged to yield the estimated straightness error motion $E_{ZX}$ for each value of A. FIG. 14(a) and FIG. 14(b) compare the commanded and estimated values for hp($E_{ZX}$), the high-pass filtered values of $E_{ZX}$. The error motions are high-pass filtered because the specific accelerometer was determined post facto to have noise during testing that exceeded the noise specification listed in Table 1. Hence, convergence of $E_{ZX}$ did not occur to sufficient levels for spatial frequencies below 1.25 $m^{-1}$, so those terms were filtered out via the use of zero-phase forward and reverse digital infinite impulse response (IIR) Butterworth filters.

FIG. 14(b) shows how the mechanically-simulated degradation is detected by the IMU-based method. As the commanded degradation amplitude A increases to 20 $\mu m$, as seen in FIG. 14(a), the estimated degradation amplitude also increases, as shown in FIG. 14(b). Error motions due to the sensor noise and mechanical elements of the machine tool are present in the curves of FIG. 14(b), but the degradation terms are still clearly visible. The estimated degradation amplitudes seen in FIG. 14(b) are roughly similar to the commanded ones seen in FIG. 14(a), but the estimated amplitudes increase as the spatial frequency of the swept-sine decreases. When the spatial frequency is at its highest around X=0.2 m, the required accelerations for the commanded motions within FIG. 14(a) for A=20 $\mu m$ are as high as 1.75 $m/s^2$ for the fast speed (0.1667 m/s), which is far greater than the maximum allowable acceleration for the machine tool during feed motion. Hence, the high-frequency motions for A=20 $\mu m$ near X=0.2 m are not detectable because they did not occur with amplitudes near 20 $\mu m$, but rather with much smaller amplitudes. Unfortunately, a laser-based device, such as a laser tracker, was not available to measure the actual amplitudes during motion for verification and validation of the acceleration-limiting motion.

Figure 14:
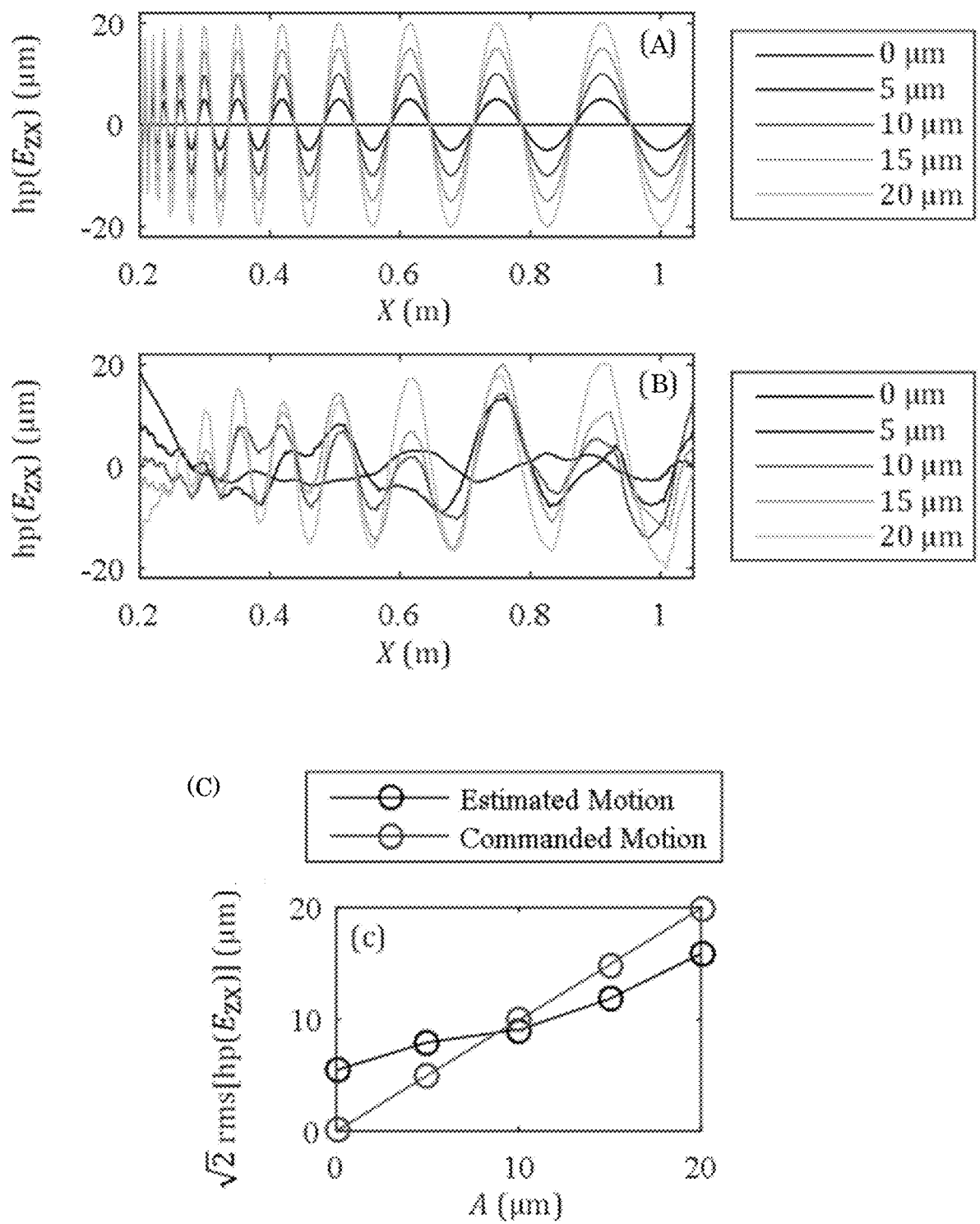
FIG. 14 shows a comparison of (a) commanded and (b) estimated high-pass filtered error motions with their (c) metric values as a function of degradation amplitude.

The high-passed motions, shown in FIG. 14 for various amplitudes A, can be processed with a single metric value for comparison and tracking of 'degradation'. FIG. 14(c) shows the scaled root mean square (rms) of each of the curves seen in FIG. 14(a) and FIG. 14(b). The metric for the commanded motion increases linearly from 0 $\mu m$ (the smallest value for A) to 20 $\mu m$ (the largest value for A) as A increases, while the metric for the estimated motion increases fairly linearly from about 5 $\mu m$ to about 16 $\mu m$. The estimated-motion metric value reaches 5 $\mu m$, instead of 0 $\mu m$, at A=0 $\mu m$ because even with no commanded cross-axis motion (A=0 $\mu m$), the Z-axis still exhibits an error motion as the X-axis moves. At the other end, the estimated-motion metric value reaches 16 $\mu m$, instead of 20 $\mu m$, at A=20 $\mu m$ because of the machine tool's acceleration limit that inhibits the Z-axis motion, as evidenced in FIG. 14(b). Nonetheless, FIG. 14(c) reveals how even a simple metric, based on results from the IMU-based method, can track linear axis degradation in a quantitative manner.

Detection of Angular Error Motion.

Another experiment was conducted to test the capability of the IMU for on-machine detection of error motions. However, before experimentation, the IMU was improved via replacement of the triaxial accelerometer with a different model that had relatively stable low-frequency noise, but higher overall noise (69 $(\mu m/s^2)/\sqrt{Hz}$) compared to the accelerometer used in the first experiment (see Table 1).

Figure 15:
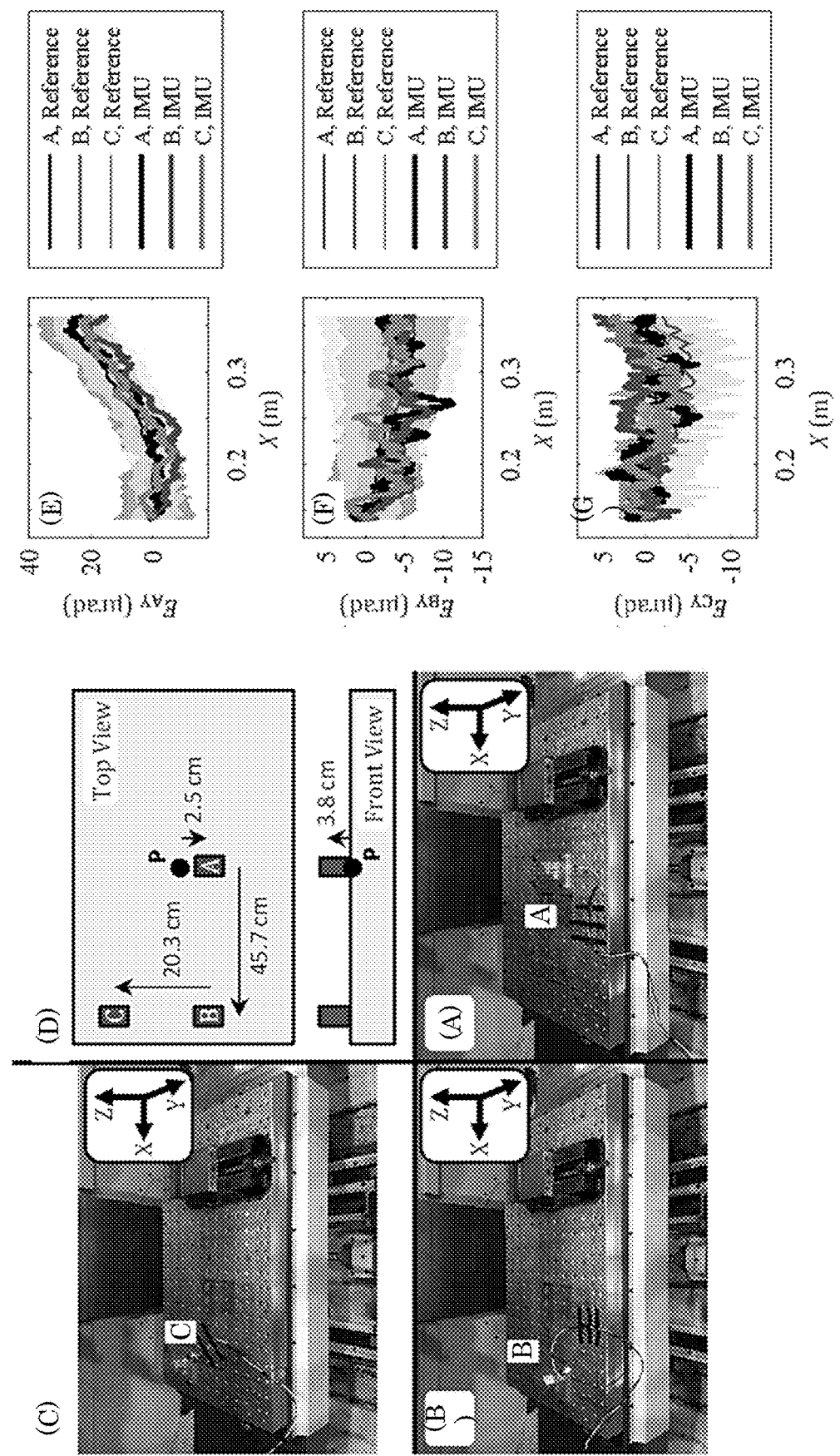
FIG. 15 shows an experimental setup of an IMU disposed on a machine tool worktable in which IMU is disposed at (a) Location A, (b) Location B, and (c) Location C, wherein (d) shows a schematic of three IMU locations relative to center point P of worktable, such that angular errors (e) $E_{AY}$, (f) $E_{BY}$, and (g) $E_{CY}$ are based on data collected at the three locations (Locations A, B, and C) with the IMU and a reference system; the reference data has shaded areas representing measurement expanded uncertainties (k=2) at 95% confidence based on five runs.

FIG. 15(a-d) shows an experimental setup of the IMU on a vertical milling machine at the National Institute of Standards and Technology (NIST). For each dataset, the IMU is attached to the worktable at one of three different locations (A, B, or C) and the Y-axis travels between Y=0 m and Y=0.5 m. Hence, IMU data was collected for 50 runs sequentially at each location with motion back and forth along the Y axis for use within the method. The three speeds for data collection are 0.5 m/s (fast speed), 0.1 m/s (moderate speed), and 0.02 m/s (slow speed). The IMU data was then used to estimate the three angular error motions at each of the three worktable locations (A, B, and C). The accelerometer and rate gyroscope data were processed to estimate two angular error motions ($E_{AY}$ and $E_{BY}$), while the rate gyroscope data only was used to estimate the third angular error motion ($E_{CY}$). If the worktable is rigid, then the estimated angular error motions should be identical among each location.

FIG. 15(e-g) shows the estimated angular errors based on the IMU data. Error motion data was also collected at each location with a laser-based commercial reference system (with standard uncertainties of 0.7 $\mu m$ and 3.0 $\mu rad$), and the data from the reference system is shown in the figures (as thinner lines) for comparison purposes. At each worktable location, reference data was collected for five runs, which were averaged to produce the curves seen in FIG. 15(e-g). The standard deviations of each set of five runs was also used to produce the shaded 95%-confidence zones in FIG. 15(e-g). Thus, the shaded zones represent a contribution towards, but not the total of, the measurement uncertainty.

As seen in FIG. 15(e-g), the estimated angular errors from the IMU data match each other respectively to within about 5 grad for the three worktable locations (A, B, and C). Also, the estimated error motions from the IMU match those from the reference system to within about 8 grad. The differences may be due to differences in error type (inertial for IMU, while relative for the reference system) as well as to sources of uncertainty.

The IMU was developed to test the effectiveness of a new IMU-based method for on-machine application. The industrial IMU includes a triaxial accelerometer and a triaxial rate gyroscope, both with noise levels shown to be sufficiently low for convergence via averaging. One experiment was conducted in which two stacked axes were moved simultaneously to simulate translational degradation up to 20 μm in amplitude. The IMU data showed that the mechanically-simulated degradation is detected by the IMU-based method. In a second experiment, data was collected from an improved IMU at three different locations on a worktable for the same axis motion. The IMU results were within about 8 μrad of those from a laser-based reference system. Both experiments show that the IMU-based method detects micrometer-level and microradian-level degradation of linear axes. When coupled with existing data exchange and formatting standards, verified and validated data from an 'industrial IMU' provides manufacturers and machine tool operators with near-real-time equipment health, diagnostic, and prognostic intelligence to significantly enhance asset availability and minimize unscheduled maintenance. This information can be coupled with equipment performance metrics and quality data (resultant from part inspection) to enable the prediction of future machine performance and part quality based upon current and projected equipment health.

Example 2. Inertial Measurement Unit for On-Machine Diagnostics of Machine Tool Linear Axes An IMU was created for application of an IMU-based method on a machine tool for detection of linear axis error motions. Data collection and analysis are integrated within a machine controller, and the process is streamlined for the optimization of maintenance activities and scheduling, supporting more intelligent decision-making by manufacturing personnel and the development of self-diagnosing smart machine tools.

Machine tool linear axes move the cutting tool and workpiece to their desired positions for parts production. A typical machine tool has multiple linear axes, and their accuracies directly impact the quality of manufactured parts. However, over a machine tool's lifetime, various faults lead to performance degradation, lowering accuracy and repeatability. Typical sources of errors within linear axes are due to pitting, wear, corrosion, and cracks of the system components such as guideways and recirculating balls. As degradation increases, tool-to-workpiece errors increase that eventually may result in a failure and/or a loss of production quality. Yet knowledge of degradation is illusive; proper assessment of axis degradation is often a manual, time-consuming, and potentially cost-prohibitive process.

An online condition monitoring system for linear axes is needed to help reduce machine downtime, increase productivity and product quality, and improve knowledge about manufacturing processes. Consequently, efficient quantitative measures are needed to monitor the degradation of linear axes. An inertial measurement unit herein is attractive for on-machine condition monitoring.

Figure 16:
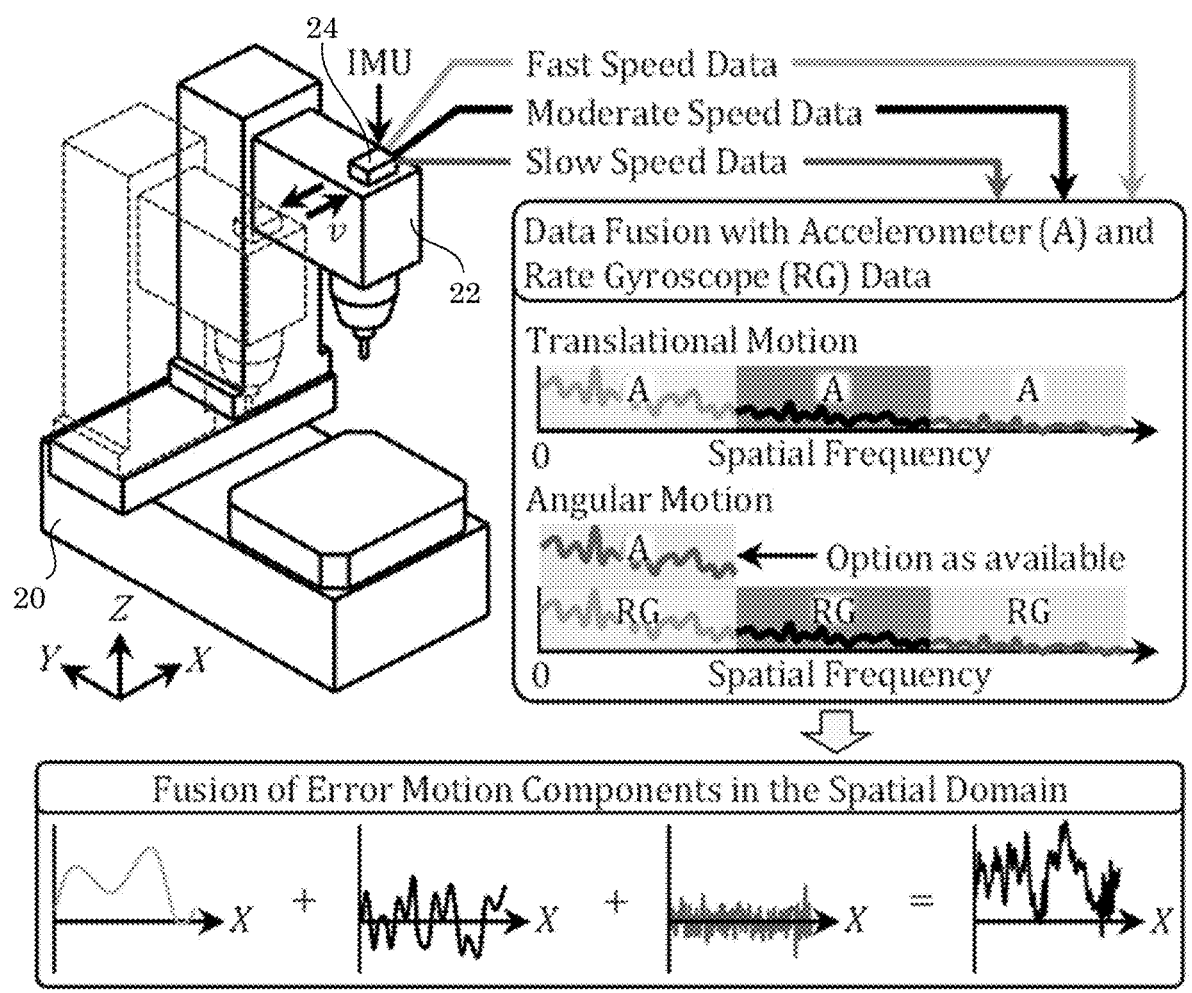
FIG. 16 shows a process for diagnosing performance degradation of a machine tool with an IMU.

Online monitoring of linear axis degradation was implemented with an IMU. As seen in the schematic of FIG. 16, an IMU is mounted to a moving machine tool component. To diagnose axis degradation, the axis is moved back and forth at various speeds to capture data for different frequency bandwidths. This data is then integrated, filtered, and 'fused' to estimate the changes in the 6-degree-of-freedom WOO geometric errors of the axis. Because the linear axes are stacked, coordinate transformations may be used with all 6-DOF errors to estimate the errors at the functional point. Data can be collected periodically to track axis degradation with minimal disruptions to production. With robust diagnostics and prognostics algorithms, incipient faults may be detected and future failures may be avoided. In essence, IMU data can be used to help optimize maintenance, production planning, flexibility, and ultimately part quality.

IMU and Error Motions for Diagnostics.

A testbed was designed for evaluation of the IMU-based method. As seen in FIG. 17(a), the testbed includes a translation stage, the IMU, a commercial laser-based system for measuring the geometric errors of the axis, and a direct current (DC) motor with encoder for motion control. While the metrology system measures the motion of the carriage with respect to the base of the linear axis, the carriage-mounted IMU measures the changes in the inertial motion of the carriage. The commercial metrology system measures straightness and angular error motions over the travel length of 0.32 m with standard uncertainties of 0.7 μm and 3.0 grad, respectively. The laser-based system is used for verification and validation (V&V) of the IMU-based results.

For the detection of both translational and rotational motions, the IMU contains three accelerometers and one triaxial rate gyroscope, as seen in FIG. 17(b). Table 2 outlines key specifications of the IMU sensors. Individual sensors were used to obtain sufficiently low noise, despite the larger sensor volume compared to a single 6-DOF IC sensor.

TABLE 2

| Accelerometer | 0 Hz to 1800 Hz | 4.0 (μm/s$^2$)/√Hz from 0 Hz to 100 Hz |
|---|---|---|
| Rate Gyroscope | 0 Hz to 200 Hz | 35 (μrad/s)/√Hz |

[a]frequencies correspond to half-power points, also known as 3 dB points

Figure 18:
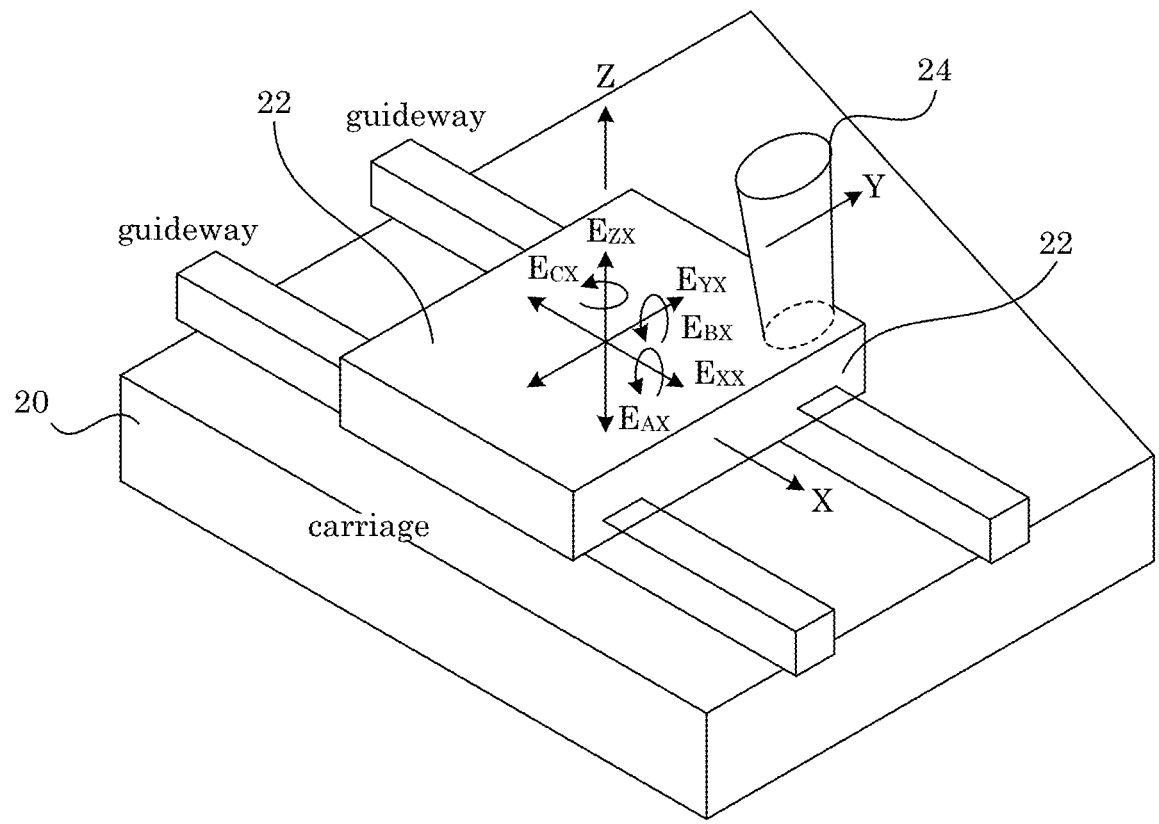
FIG. 18 shows displacement and angular errors of a motion member commanded to move along a (nominal) straight-line trajectory parallel to the X-axis.

Consequently, these sensors enable the estimation of 6-DOF motion. A typical machine tool has three linear axes, which means that a total of 18 (=6×3) translational and angular motion errors exist. These errors are major contributors to the position-dependent tool-to-workpiece errors. FIG. 18 shows these six errors that change with axis degradation. As the carriage is positioned along the X axis, it experiences three translational errors from its nominal path: one linear displacement error ($E_{XX}$) in the X-axis direction and two straightness errors ($E_{YX}$ and $E_{ZX}$) in the Y- and Z-axis directions. The carriage also experiences three angular errors ($E_{AX}$, $E_{BX}$, and $E_{CX}$) about the X-, Y-, and Z-axes.

Small levels of degradation of linear axes are expected and allowed, but there are limits specified for axis errors. ISO 10791-2 (International Organization for Standardization, 2001) specifies the tolerances for linear axis errors of vertical machining centers. As shown in Table 3, the acceptable straightness error is limited to 20 μm and the acceptable angular error is limited to 60 μrad. A test uncertainty ratio (TUR) of at least 4:1 is deemed to be acceptable, which means that straightness and angular error measurement uncertainties of 5 μm and 15 μrad, respectively, are acceptable based on the tolerances outlined in Table 3.

TABLE 3

| Straightness | 20 μm |
|---|---|
| Angular (Pitch, Yaw, or Roll) | 60 μrad |

* for axes capable of 1 meter of travel, according to ISO 10791-2

IMU-Based Method and General Results.

As outlined in FIG. 16, the IMU-based method relies on fusion of data collected at three programmed speeds of the carriage: Fast speed ($v_1$=0.5 m/s), Moderate speed ($v_2$=0.1 m/s), and Slow speed ($v_3$=0.02 m/s). The different speeds allow for sensing of repeatable error motions, composed of low to high spatial frequencies, within different temporal bandwidths. Such a process takes advantage of the enhanced signal-to-noise and lower sensor drift at faster speeds, while taking advantage of the detection of higher spatial frequencies at slower speeds without violating sensor bandwidths. As seen in FIG. 16, matching the spatial cutoff frequencies enables the data fusion, while filtering allows for the attenuation of significant modal excitations, especially resulting from the initial and final accelerations during the Fast speed cycle.

Figure 19:
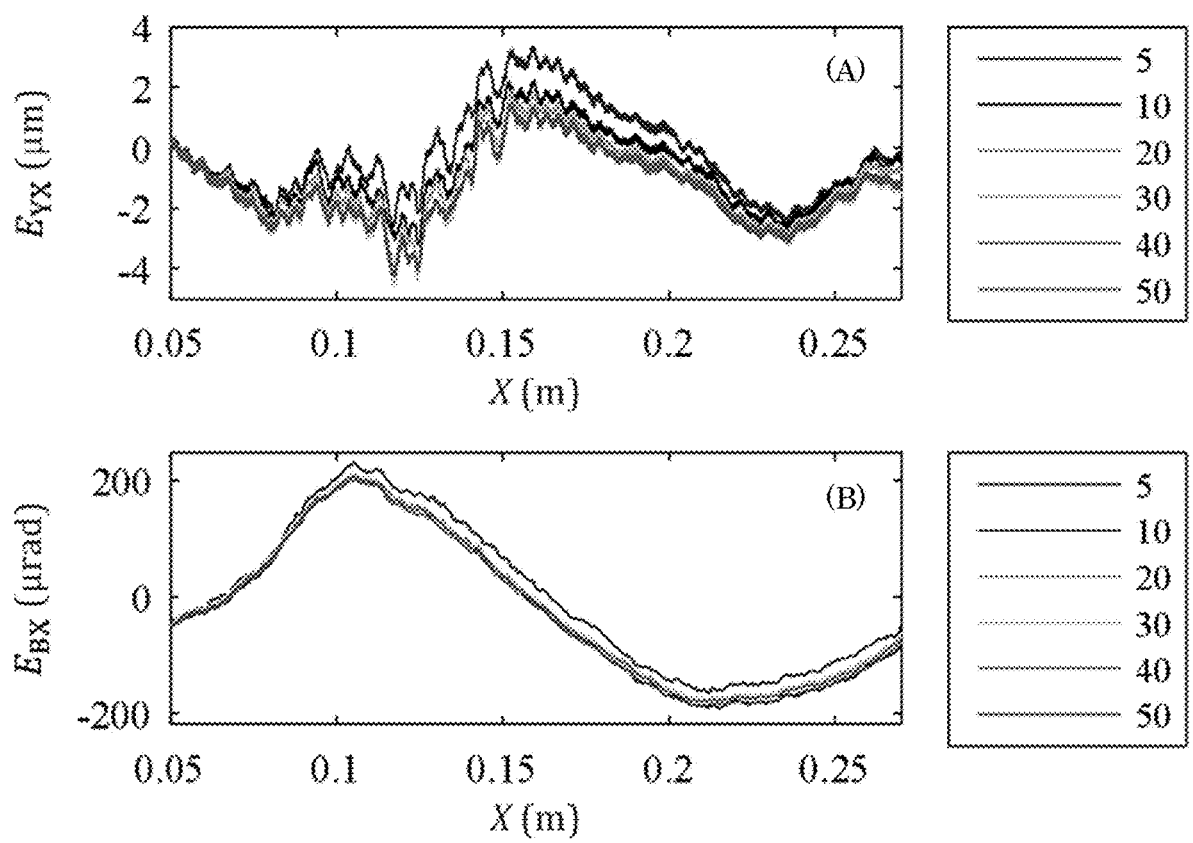
FIG. 19 shows convergence of (a) an estimated straightness error motion (via accelerometer data) and (b) an estimated angular error motion (via rate gyroscope data) with increasing number of runs for averaging (from 5 to 50)
Figure 20:
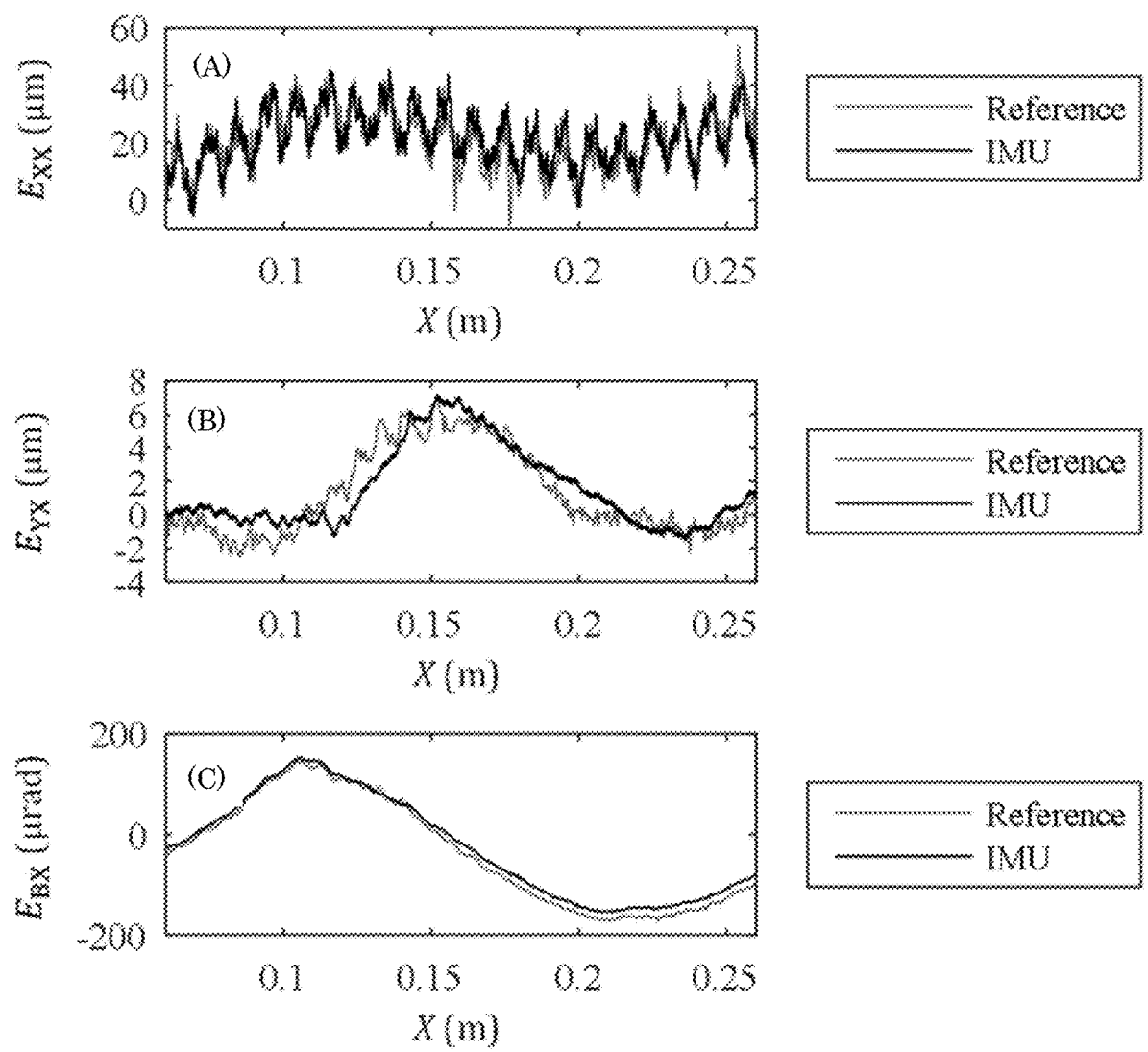
FIG. 20 shows converged (a) linear positioning error motion, (b) straightness error motion, and (c) angular error motion for various sensing methods with an IMU.

FIG. 19 shows the typical convergence of an estimated straightness error motion and an estimated angular error motion with increasing number of runs for averaging. As seen in FIG. 19, 10 runs is usually sufficient for convergence within 5 μm or 15 μrad, which means the IMU-based method has the potential to estimate geometric motion errors with a test uncertainty ratio (TUR) of at least 4:1. FIG. 20 compares the laser-based measurement and IMU-based results; the standard deviations of the differences are 11 μm, 2.3 μm, and 13 μrad for the linear positioning, straightness, and angular error motions, respectively.

Testbed Experimentation.

Figure 21:
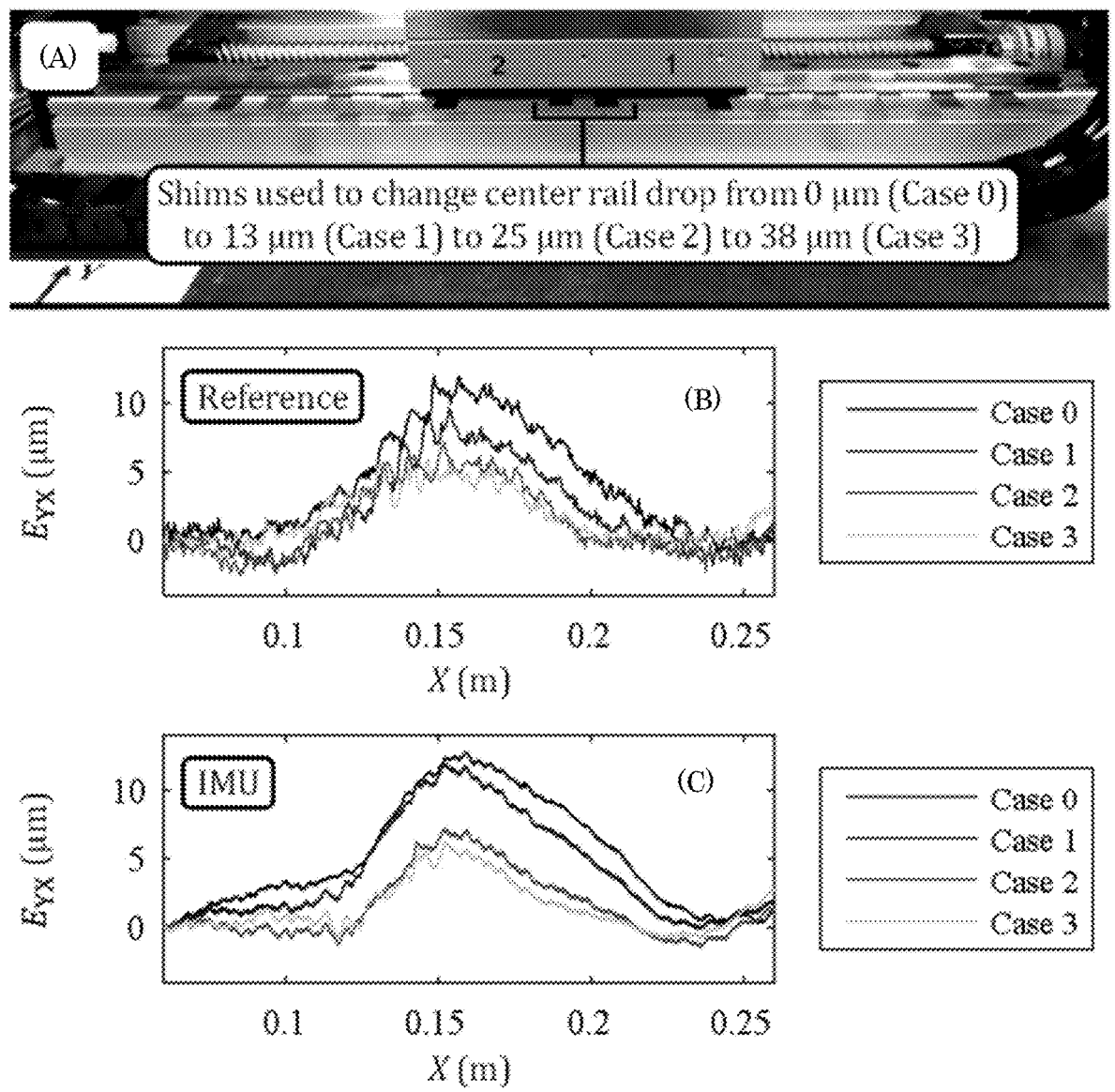
FIG. 21 shows (a) an experimental setup to represent low-frequency degradations of a guideway rail of a base member, resulting in changes in straightness error motion ($E_{YX}$) observed by (b) a laser-based reference system and (c) an IMU.

FIG. 21(a) shows how a linear axis rail was deformed with shims to simulate low spatial frequency degradations of a machine tool axis. The entire rail was raised with shims so that the center shims could be changed without loosening more than one screw (the center rail screw). Measurements for each case were taken with the reference- and IMU-based systems, resulting in the Y-axis straightness error motions seen in FIG. 21(b) and FIG. 21(c), respectively. The IMU-based method is able to detect the approximately 5 μm change in straightness from Case 0 to Case 4, as verified by the reference measurements.

Figure 22:
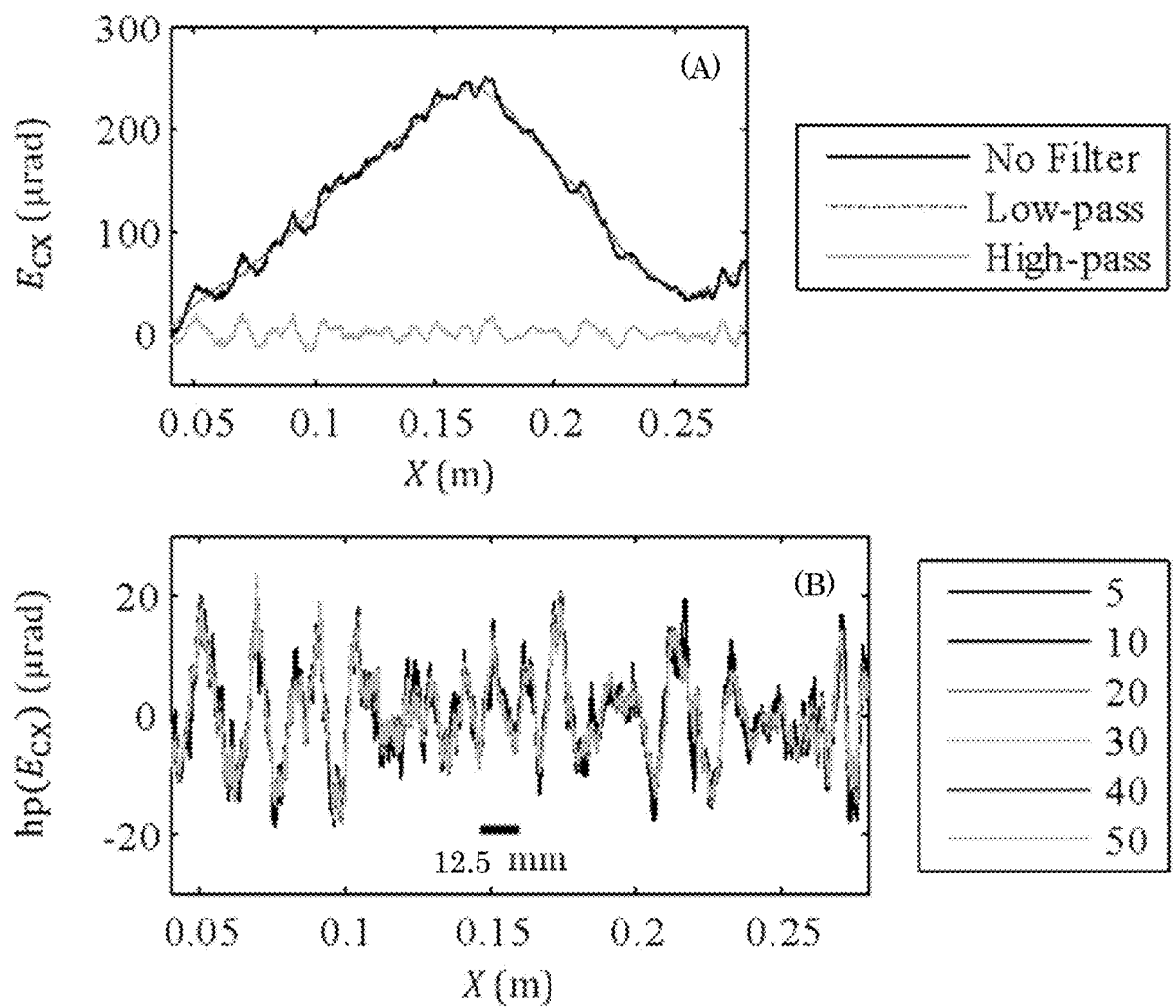
FIG. 22 shows (a) yaw error motion ($E_{CX}$) separated into low- and high-pass components, and (b) the high-pass component of $E_{CX}$ for various number of runs for averaging (from 5 to 50)

One approach for investigating degradation of linear axes is to use filtering to focus on certain sources of errors, such as surface pitting of the rails Specifically, low-frequency components can be neglected through high-pass filtering. Towards this end, FIG. 22(a) shows data smoothed via use of a linear Savitzky-Golay smoothing filter. The frame size for the Savitzky-Golay filter was chosen to be 2 cm, which is large compared to millimeter-sized defects. Thus, the high-pass filtered data is representative of many defects caused by wear. In FIG. 22(a), the error motion ('No filter') is filtered via the Savitzky-Golay filter to produce low-pass filtered data (Low-pass), and the high-pass filtered data ('High-pass') is the complement of the low-pass filtered data; the low-pass and high-pass filtered data sum to yield the unfiltered error motion.

This filtering process can be applied to any linear axis error motion. FIG. 22(b) shows typical high-pass filtered data for $E_{CX}$ for various numbers of runs for averaging (from 5 to 50), where hp($E_{CX}$) is the high-pass filtered data of $E_{CX}$. As seen in FIG. 22(b), convergence for hp($E_{CX}$) is achieved to within 5 μm (TUR=4) in less than 10 runs for averaging. Furthermore, the high-pass filtered error motion reveals influences from the ball bearings in the trucks. Each ball has a diameter of about 4 mm, which means that each ball rolls on its rail with a ball-passing distance of 12.5 mm (the ball circumference). FIG. 22(b) shows how the combined influence of these balls creates a net error motion with significant components dependent upon the ball-passing distance.

IMU for Industrial Application.

Figure 17:
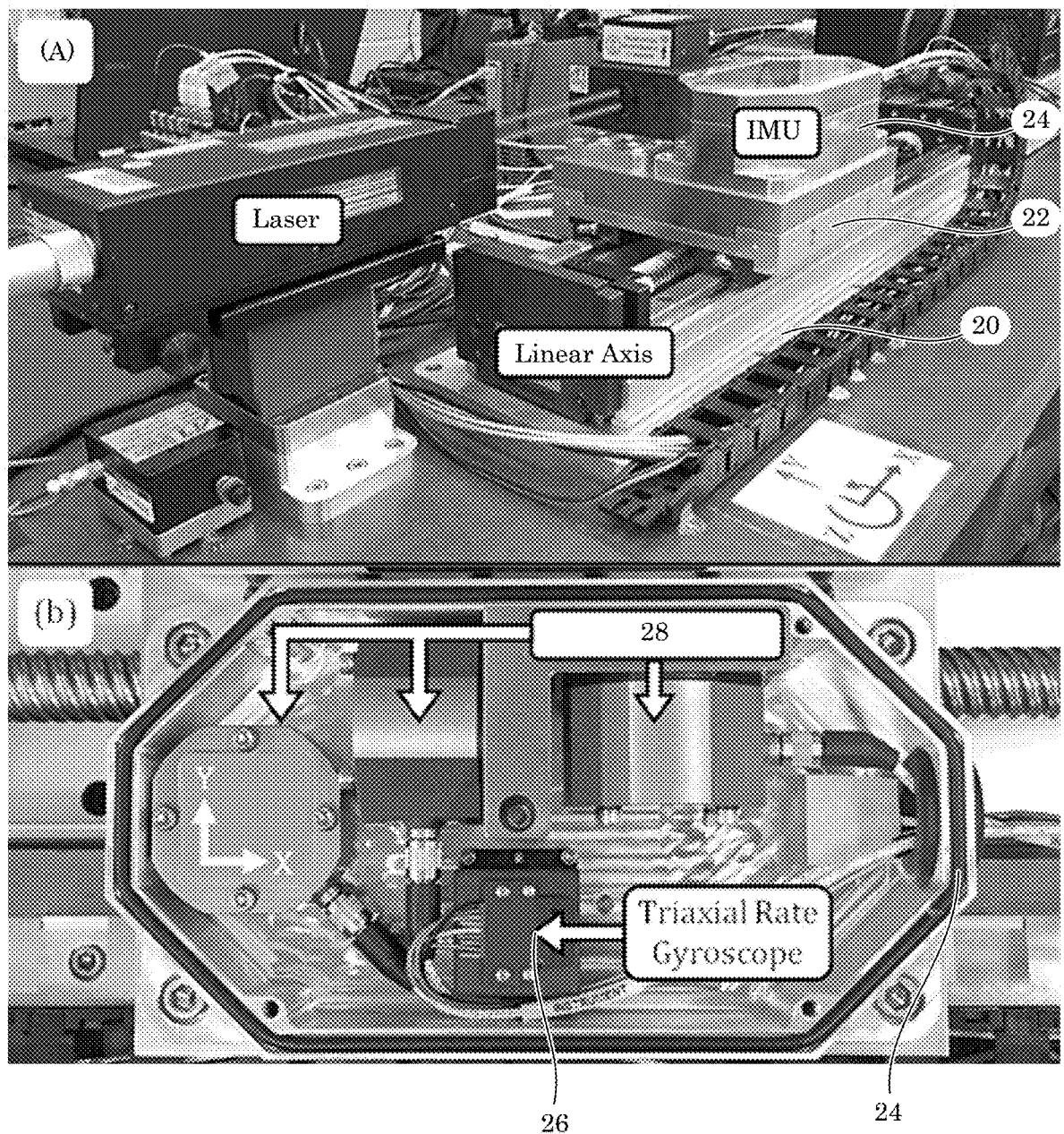
FIG. 17 shows (a) linear axis testbed for an IMU and (b) top view of the IMU without its lid.

The IMU seen in FIG. 17 was created for testing of the method within the linear axis testbed. For industrial application, the IMU can be physically smaller and more economical while still satisfying the measurement needs.

For application on machine tools, an 'industrial IMU' was created that is about 73% smaller than the 'testbed IMU'. As seen in FIG. 6, the industrial IMU is about 9 cm long and contains a triaxial accelerometer and a triaxial rate gyroscope. The bandwidths and noise properties of these sensors are seen in Table 4. The rate gyroscope in the industrial IMU is identical to the one used in the testbed IMU. In contrast, the three uniaxial accelerometers seen in FIG. 17(b) have been replaced with a triaxial accelerometer seen in FIG. 6(b). This change had many advantages: the reduction of space required for acceleration sensors, the elimination of the L-bracket for accelerometer mounting, and a significant reduction of sensor cost. However, the change also had some disadvantages, specifically the reduction of accelerometer bandwidth from 1800 Hz to 500 Hz and the 5-fold increase of accelerometer noise from 4.0 (μm/s$^2$)/√Hz to 20 (μm/s$^2$)/√Hz.

TABLE 4

| Accelerometer | 0 Hz to 500 Hz | 20 (μm/s$^2$)/√Hz |
|---|---|---|
| Rate Gyroscope | 0 Hz to 200 Hz | 35 (μrad/s)/√Hz |

[a] frequencies correspond to half-power points, also known as 3 dB points

Figure 23:
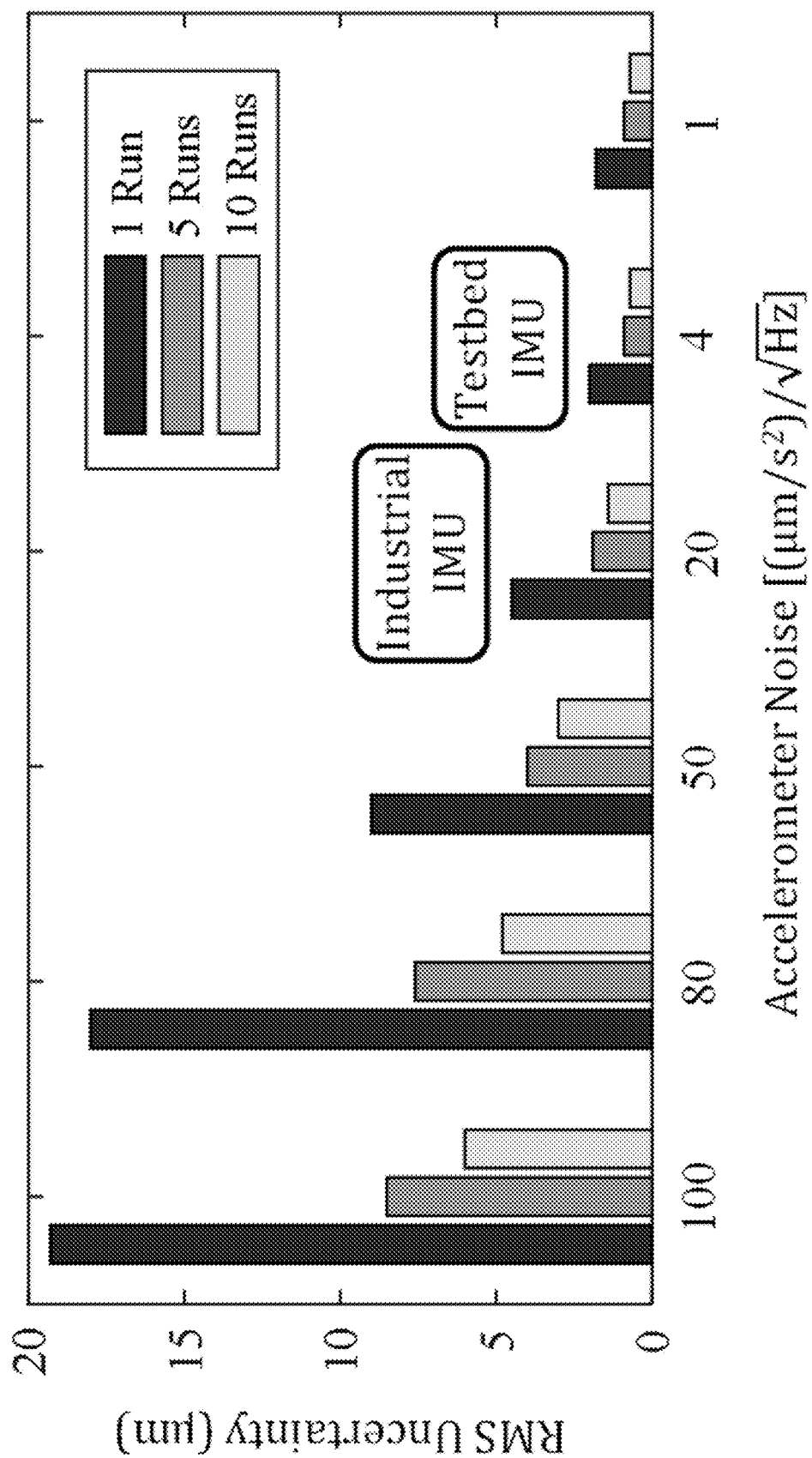
FIG. 23 shows simulated uncertainty for straightness error motions due to data fusion with accelerometer noise and data acquisition noise from an IMU.

According to simulations of the data fusion process, the accelerometer used in the industrial IMU will result in approximately twice as much uncertainty in straightness errors as that for the testbed IMU. As seen in FIG. 23, the 5-fold increase of accelerometer noise from 4.0 (μm/s$^2$)/√Hz (for the testbed IMU) to 20 (μm/s$^2$)/√Hz (for the industrial IMU) should result in an approximate 2-fold increase in straightness uncertainty. FIG. 23 shows that as the accelerometer noise decreases, the uncertainty decreases to a limit caused by noise of the data acquisition (DAQ) equipment. Experimental data can be collected to confirm the slower rate of convergence for the industrial IMU.

Manufacturers need efficient and robust methods for diagnosis of machine tool linear axes with minimal disruptions to production. Towards this end, a new IMU-based method was developed for linear axis diagnostics. Measurements from accelerometers and rate gyroscopes are used to identify changes in translational and angular error motions due to axis degradation. Data is fused in the spatial frequency domain via filtering in order to include both low- and high-frequency error motions while excluding significant modal excitations. A linear testbed was used to verify and validate the IMU-based method through use of a laser-based system for measurement of the geometric axis performance. The IMU-based results typically converge within 5 µm or 15 µrad when using 10 runs for averaging, needed for the estimation of changes in geometric motion errors with test uncertainty ratios of at least 4:1.

Data collection and analysis can be integrated within a machine controller, and the process can be streamlined for the optimization of maintenance, supporting the development of self-diagnosing smart machine tools. When coupled with existing data exchange and formatting standards, verified and validated data from an 'industrial IMU' provides manufacturers and machine tool operators with near-real-time equipment health, diagnostic, and prognostic intelligence to significantly enhance asset availability and minimize unscheduled maintenance.

Example 3. Diagnostics for Geometric Performance of Machine Tool Linear Axes

For online monitoring of linear axis degradation of an inertial measurement unit was constructed. As seen in FIG. 16, an IMU is mounted to a moving machine tool component. To diagnose axis degradation, the axis is moved back and forth at various speeds to capture data for different bandwidths. This data is then 'fused' to estimate the changes in the 6-degree-of-freedom (DOF) geometric errors of the axis. Because the linear axes are stacked, coordinate transformations may be used with all 6-DOF errors to estimate the errors at the functional point. Data can be collected periodically to track axis degradation with minimal disruptions to production. With robust diagnostics and prognostics algorithms, incipient faults may be detected and future failures may be avoided. In essence, IMU data can be used to help optimize maintenance, production planning, and ultimately part quality.

This Example describes an IMU-based method for diagnostics of machine tool linear axes. A linear axis testbed was designed to physically implement the custom IMU and the IMU-based method. Various degradation patterns were experimentally simulated by adjustments of a guideway rail or defects imparted on bearing balls. This paper outlines the major findings of these experiments, revealing the potential of the novel IMU-based approach for diagnostics and prognostics of machine tools.

Testbed Setup.

A testbed was designed for evaluation of the IMU-based method. As seen in FIG. 17(a), the testbed includes a linear axis, the IMU, a commercial laser-based system for measuring the geometric errors of the axis, and a direct current (DC) motor with encoder for motion control. While the metrology system measures the motion of the carriage with respect to the base of the linear axis, the carriage-mounted IMU measures the changes in the inertial motion of the carriage. The commercial metrology system is able to measure straightness and angular error motions over the travel length of 0.32 m with standard uncertainties of 0.7 µm and 3.0 µrad. The laser-based system is used for verification and validation (V&V) of the IMU-based results.

For the detection of both translational and rotational motions, the IMU contains three accelerometers and one triaxial rate gyroscope, as seen in FIG. 17(b). Table 5 outlines key specifications of the IMU sensors. Each sensitive direction is nominally aligned with either the X-, Y-, or Z-axis of the testbed coordinate system. Consequently, these sensors enable the estimation of 6-DOF motion.

TABLE 5

| Sensor | Bandwidth[a] | Noise |
| --- | --- | --- |
| Accelerometer | 0 Hz to 1800 Hz | 4.0 (µm/s$^2$)/√Hz from 0 Hz to 100 Hz |
| Rate Gyroscope | 0 Hz to 200 Hz | 35 (µrad/s)/√Hz |

[a]frequencies correspond to half-power points, also known as 3 dB points

IMU-Based Method.

As shown in FIG. 16, the IMU-based method relies on sensor data collected during a fixed-cycle test, in which an axis is programmed to move unloaded at three constant speeds: Fast speed ($v_1$=0.5 m/s), Moderate speed ($v_2$=0.1 m/s), and Slow speed ($v_3$=0.02 m/s). Constant speeds allow for simple correlation of error motions with axis position while minimizing transient dynamic effects. The different speeds allow for sensing of repeatable error motions, composed of low to high spatial frequencies, within different temporal bandwidths. Such a process takes advantage of the enhanced signal-to-noise and lower sensor drift at faster speeds, while taking advantage of the detection of higher spatial frequencies at slower speeds without violating sensor bandwidths. As seen in FIG. 16, matching the spatial cutoff frequencies enables the data fusion, while filtering allows for the attenuation of significant modal excitations, especially resulting from the initial and final accelerations during the Fast speed cycle.

For the linear axis testbed, data is collected while the carriage moves back and forth sequentially at each of three speeds for 50 runs. Data collection for multiple runs allows averaging for convergence purposes. Once data is collected, data fusion follows.

Angular Motions.

Figure 24:
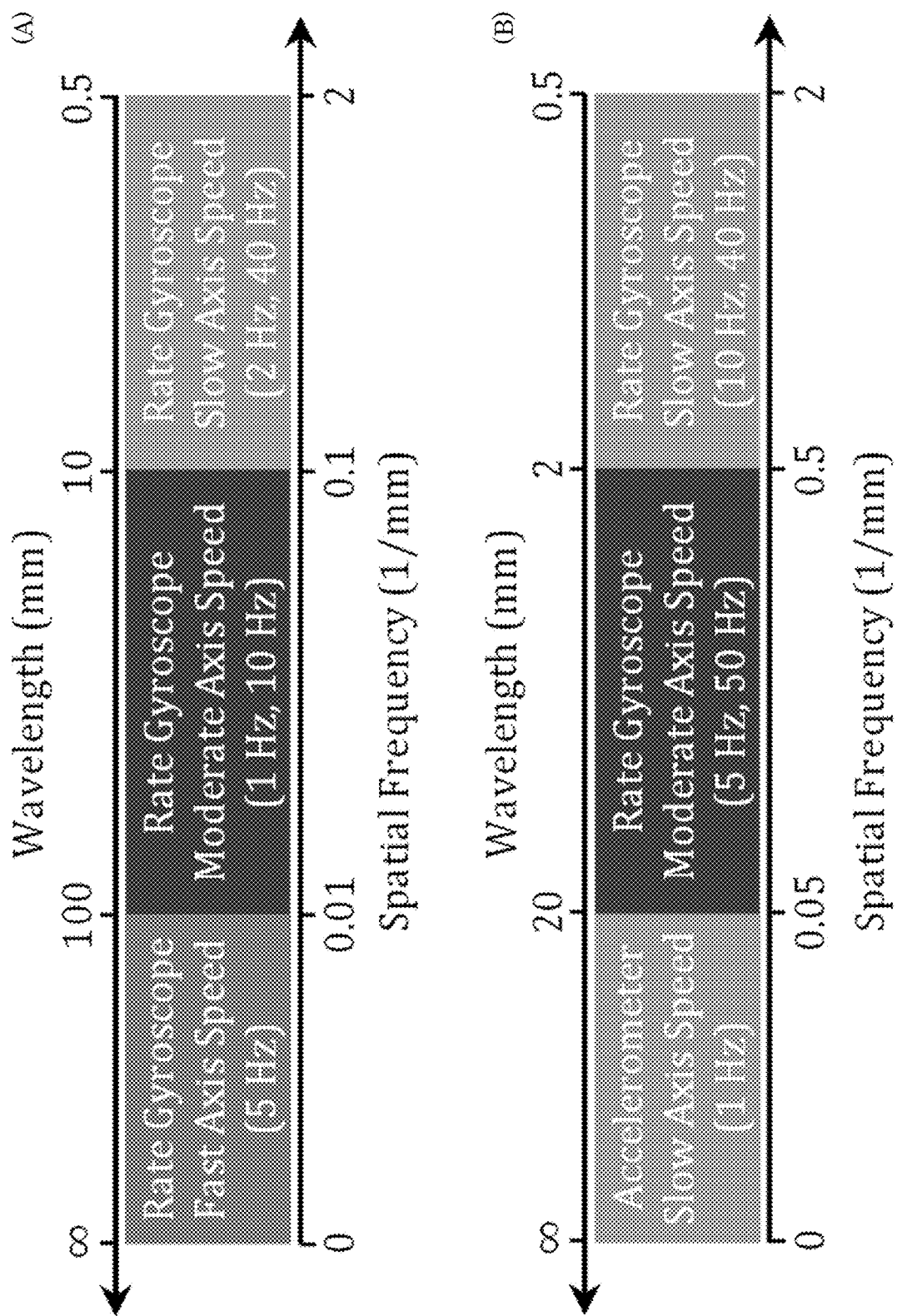
FIG. 24 shows data fusion for angular motions via use of an IMU that provides (a) rate gyroscope data or (b) accelerometer and rate gyroscope data, wherein filter cutoff frequencies are shown in parentheses.

Data fusion for estimation of angular motions is represented in FIG. 24. Rate gyroscope data for three speeds is integrated once, low- or band-pass filtered, processed, and summed to yield the total angular motions following the scheme in FIG. 24(a).

In contrast, the scheme in FIG. 24(b) may also be used to estimate the angular motions about the X- and Y-directions. Measuring down to 0 Hz (see Table 5), the three accelerometer signals ($A_X$, $A_Y$, and $A_Z$) for the X-, Y-, and Z-directions relate to the inclination angles ($\theta_X$ and $\theta_Y$) as approximately $$A_X = a_X - g\theta_Y \tag{1a}$$

$$A_Y = a_Y + g\theta_X \tag{1b}$$

$$A_Z = a_Z - \frac{1}{2}g(\theta_X^2 + \theta_Y^2) \tag{1c}$$

where g is the magnitude of acceleration due to gravity. Thus, Eqs. (1a) and (1b) yield the respective inclinations, $\theta_Y$ and $\theta_X$, when the accelerations ($a_X$ and $a_Y$) are negligible. However, the data fusion scheme in FIG. 24(b) may not be applied for the Z-axis, for which no 'inclinometer' exists.

Translational Motions.

Figure 25:
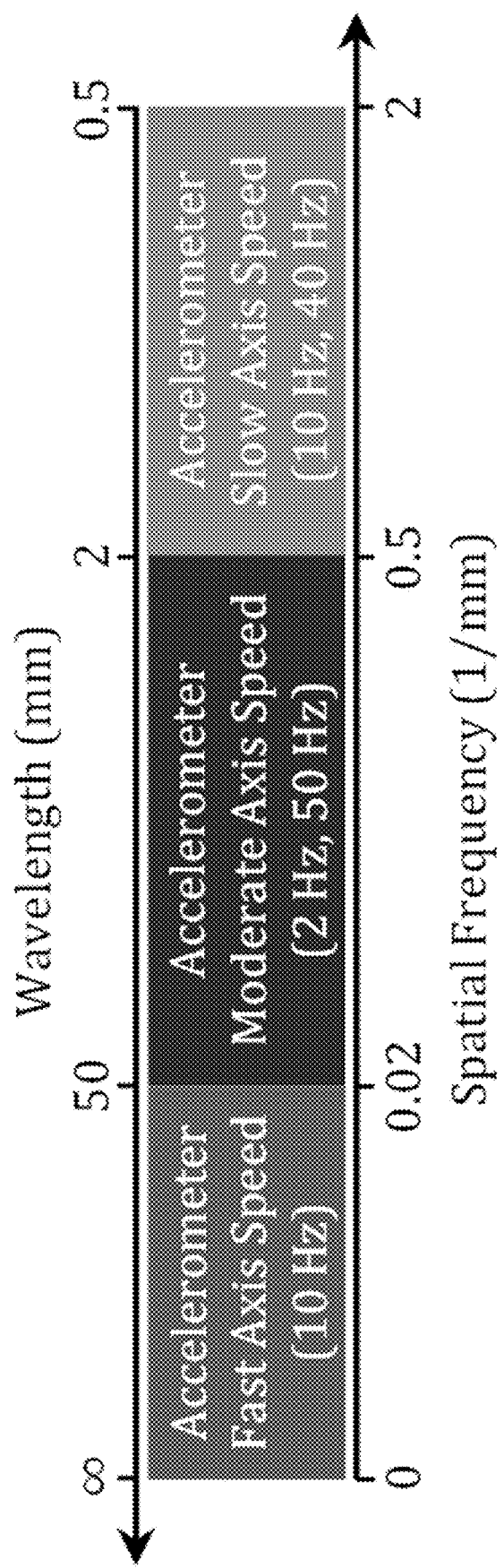
FIG. 25 shows data fusion for displacemental motions via use an IMU that provides accelerometer data, wherein filter cutoff frequencies are shown in parentheses.

Data fusion for estimation of translational error motions is represented in FIG. 25. The accelerometer data is integrated twice, low- or band-pass filtered, processed, and summed to yield the net translational motions. Similar to the schemes in FIG. 24, the scheme in FIG. 25 relies upon the matching of spatial cutoff frequencies and the exclusion of significant modal excitations.

An element of the processing utilized for the scheme in FIG. 25 involves accounting for corruptive effects due to inclinations as described by Eqs. (1a) and (1b). For the ith accelerometer, three signals are collected ($A_{i,1}$, $A_{i,2}$, and $A_{i,3}$) per run, one for each speed. Each signal may be represented as $$A_{i,n} \approx f_i(x) + a_{i,n}(t) \quad (2)$$

where $f_i(x)$ is the common inclination-related component as a function of position, x, not of time, t. Equation (2) is integrated in time and related to position as $V_{i,1}(x)$, $V_{i,2}(x)$, or $V_{i,3}(x)$. Equation (2) is then applied for two speeds (Fast and Moderate, or Moderate and Slow) to isolate the acceleration, $a_{i,n}(x)$, due to common geometric error motions, resulting in Eqs. (3a) and (3b).

$$\frac{d}{dx}(v_1 V_{i,1}(x) - v_2 V_{i,2}(x)) \approx \left[1 - \left(\frac{v_2}{v_1}\right)^2\right] a_{i,1}(x) \quad (3a)$$

$$\frac{d}{dx}(v_2 V_{i,2}(x) - v_3 V_{i,3}(x)) \approx \left[1 - \left(\frac{v_3}{v_2}\right)^2\right] a_{i,2}(x) \quad (3b)$$

Equations (3a) and (3b) are used to isolate accelerations for the 'Fast' and 'Moderate' regimes.

Convergence and General Results.

Figure 26:
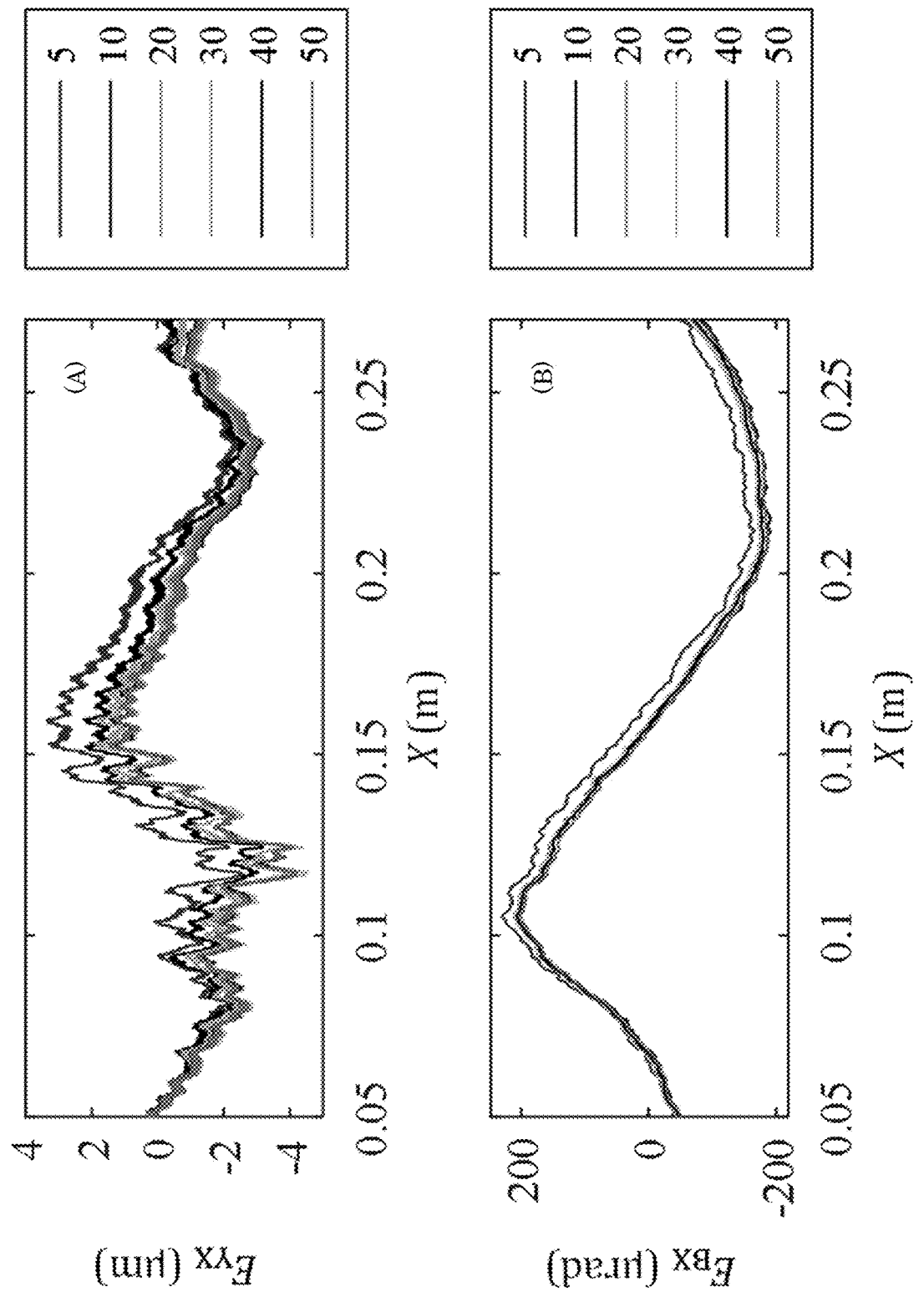
FIG. 26 shows convergence of (a) an estimated straightness error motion (via accelerometer data) and (b) an estimated angular error motion (via rate gyroscope data) with increasing number of runs for averaging.

The data fusion method is not very useful without convergence. FIG. 26 shows the typical convergence of an estimated straightness error motion and an estimated angular error motion with increasing number of runs for averaging. The errors are labelled per the convention in ISO 10791-1. As seen in FIG. 26, 10 runs are usually sufficient for convergence within 5 µm or 15 µrad, which means the IMU-based method has the potential to estimate geometric motion errors with a test uncertainty ratio (TUR) of at least 4:1 per ISO 10791-1

Figure 27:
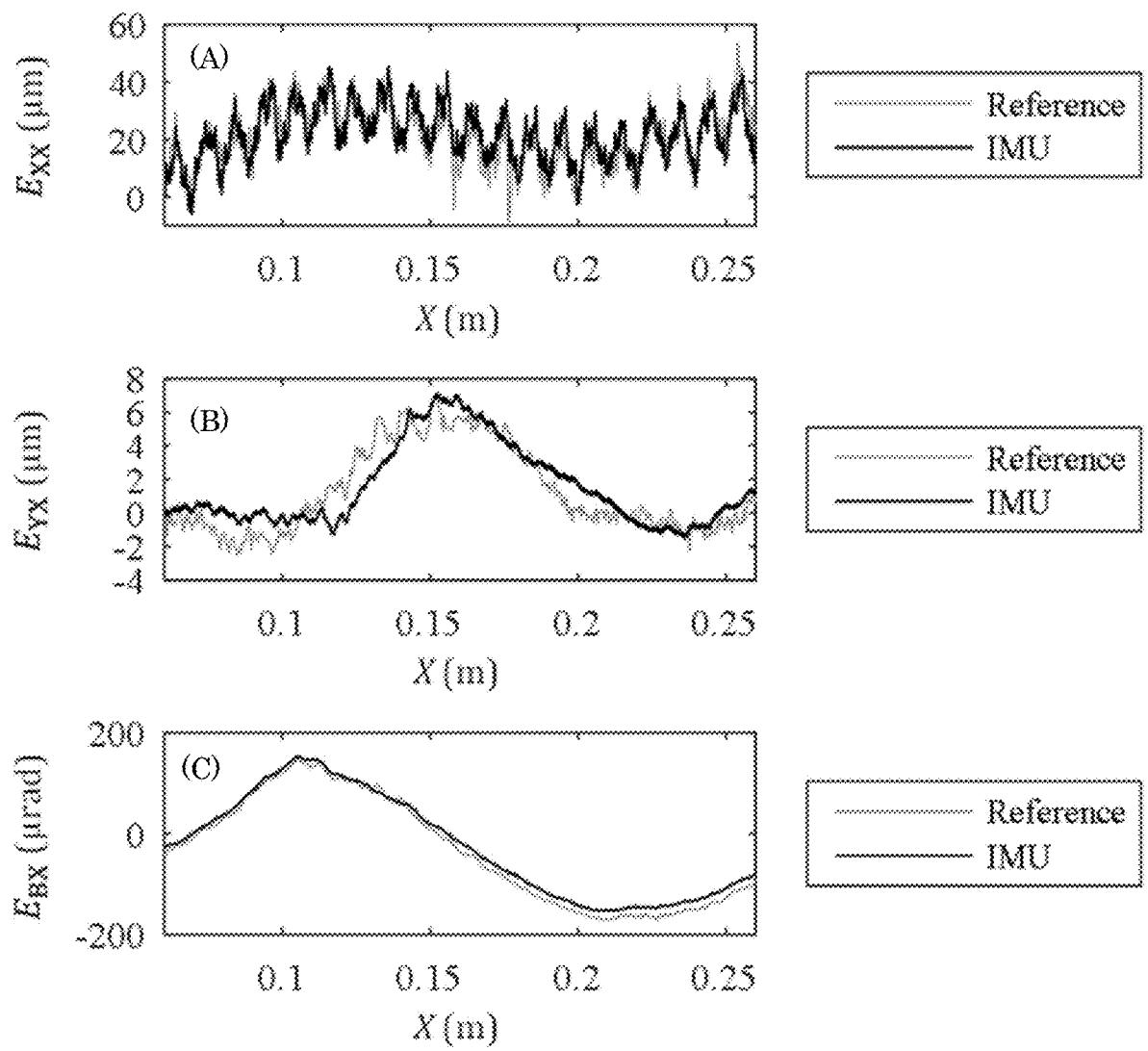
FIG. 27 shows converged (a) linear positioning error motion, (b) straightness error motion, and (c) angular error motion for various sensing processes with an IMU.

In addition to convergence, the estimated error motions should match those of the laser-based commercial system. FIG. 27 compares the laser-based and IMU-based results; the standard deviations of the differences are 11 µm, 2.3 µm, and 13 µrad for the linear positioning, straightness, and angular error motions, respectively. Lower-frequency deviations are partly due to thermal drift, since the reference and IMU data were not collected simultaneously. Higher-frequency deviations are partially due to the fact that IMU-based results are averaged for multiple runs, while laser-based results are not; differences include non-repeatable error motions.

However, due to the quadratic terms in Eq. (1c), the data fusion method is not robust for straightness error motions in the Z-axis direction. The quadratic nonlinearity implies that high-frequency angular vibrations cause low-frequency sensor offsets, which cannot be eliminated via Eq. (3a). One possible solution is to modify the IMU via rotation of the X- and Z-axis accelerometers about the Y-axis (see FIG. 12), such that accelerometer signals depend linearly on angular motions as in Eqs. (1a) and (1b).

Figure 28:
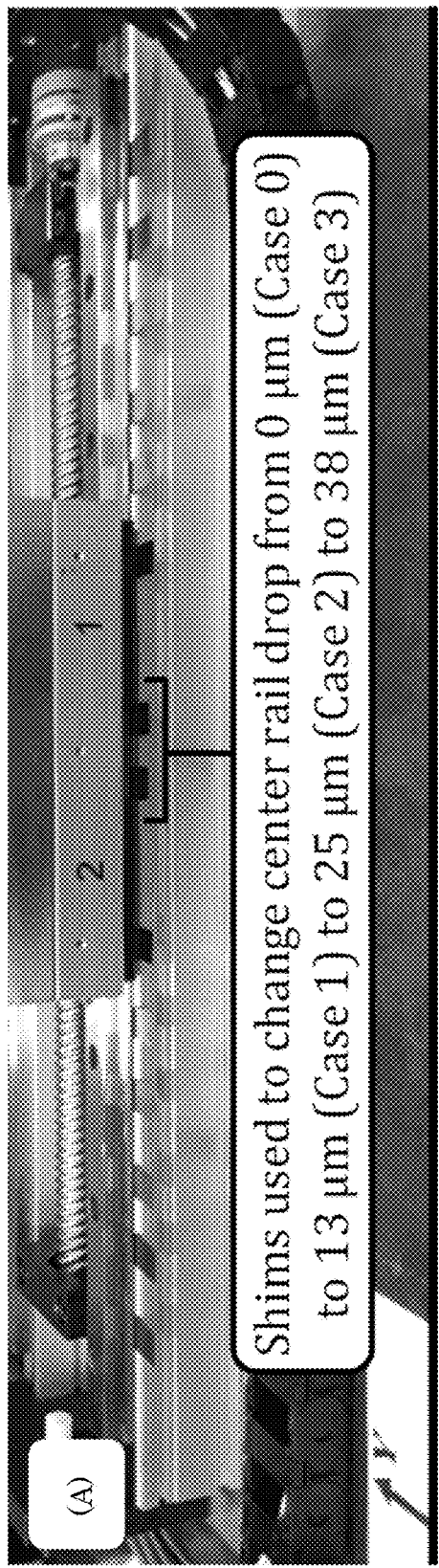
FIG. 28 shows (a) an experimental setup to represent low-frequency degradations of a guideway rail of a base member, resulting in (b) changes in pitch error motion ($E_{BX}$) observed by an IMU (data averaged for 50 runs)
Figure 28:
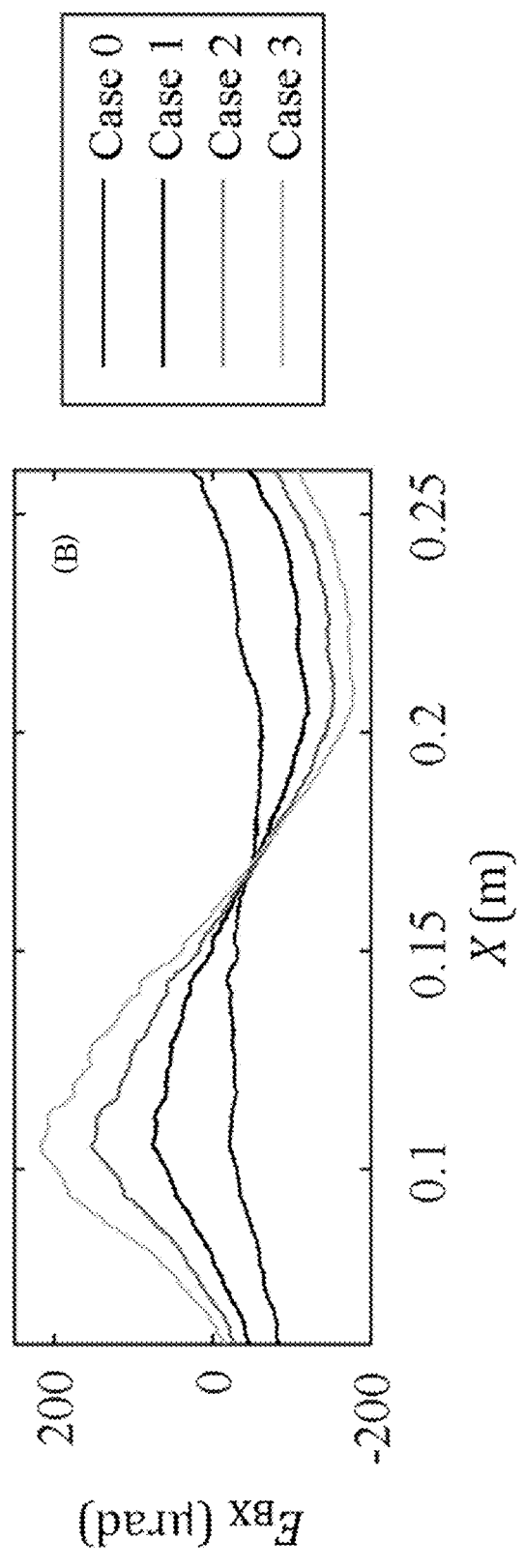

Experiments were performed to investigate the ability of the IMU-based method to resolve low- and high-frequency components of error motions. In the first experiment outlined in FIG. 28(a), a linear axis rail was deformed with shims to simulate low spatial frequency degradations of a machine tool axis. The entire rail was raised with shims so that the center shims could be changed without loosening more than one screw (the center rail screw). The systematic change in center height to 38 µm is evidenced in the change of the angle about the Y-axis, as seen in FIG. 28(b). Low spatial frequency changes over 200 µrad dominate the response with insignificant differences in high-frequency components among the curves of FIG. 28(b).

Figure 29:
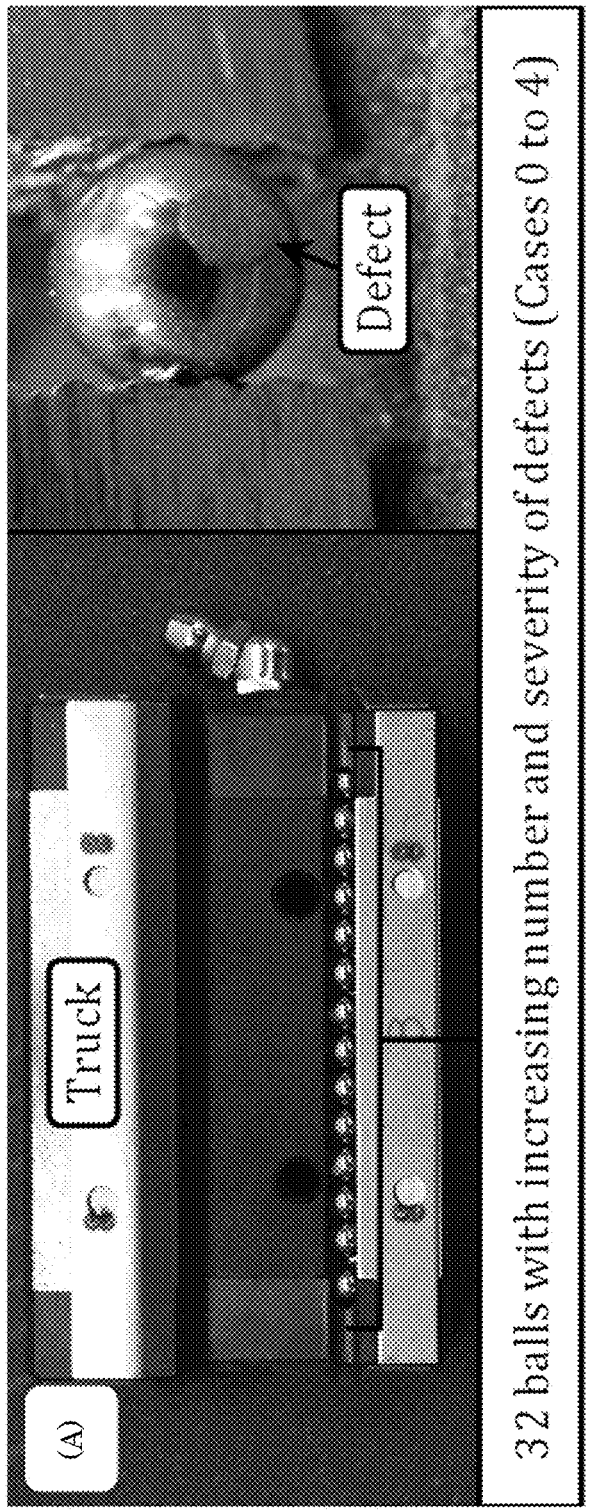
FIG. 29 shows data for high-frequency degradations due to defects of bearing balls in which (a) 32 balls of a truck were degraded via the abrasive removal of material, resulting in (b) changes in pitch error motion ($E_{BX}$) observed by an IMU (data averaged for 50 runs).
Figure 29:
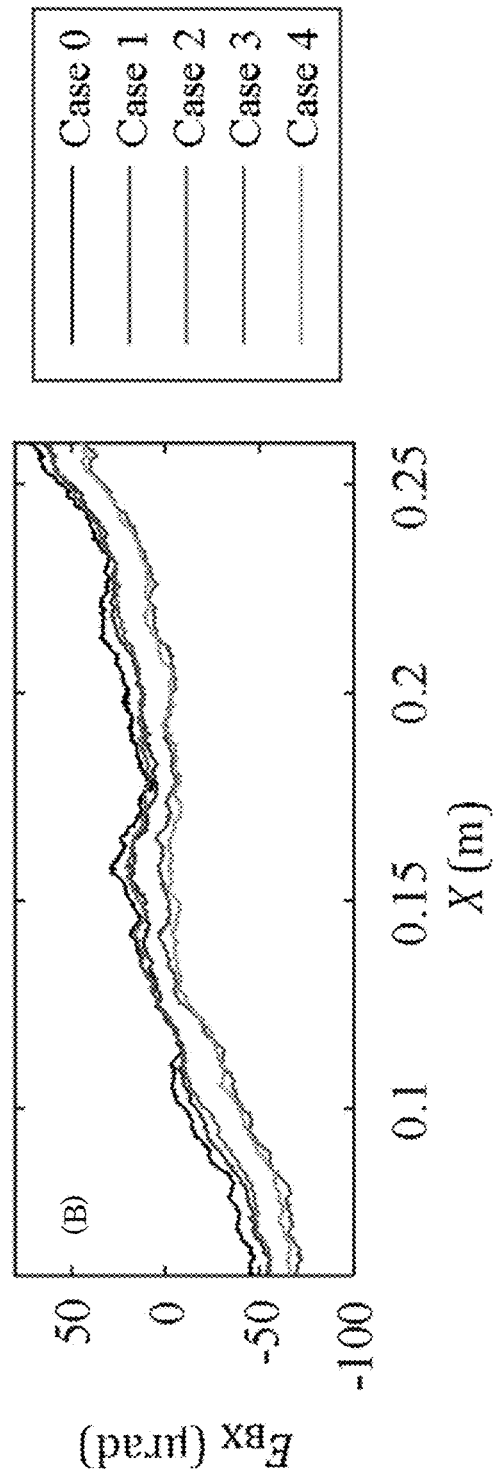

In a second experiment outlined in FIG. 29, bearing balls within a truck were degraded to simulate high spatial frequency degradations of a machine tool linear axis. Thirty-two balls of a truck were degraded via the abrasive removal of material, one ball at a time, resulting in defects in the form of flattened rougher surfaces as shown in FIG. 29(a). Case 0 in FIG. 29 is the nominal case of Grade 25 chrome steel balls with no defects (nominal diameter=3.981 mm). For each subsequent case, one extra defect was created on each ball at a random location, and the additional defect was of a greater nominal size. Defects ranged in depth from 3 µm to 10 µm. Consequently, differences are dominated by high-frequency terms among the curves of FIG. 29(b) once DC shifts (due to loosening/tightening of testbed screws between cases) are neglected.

Manufacturers need efficient and automated methods for diagnosis of machine tool linear axes with minimal disruptions to production. Towards this end, an inertial measurement unit and associated data fusion method were developed for machine tool application. The IMU-based method uses data from both accelerometers and rate gyroscopes to identify changes in translational and angular error motions due to axis degradation. Data is fused in the spatial frequency domain via filtering in order to include both low- and high-frequency error motions while excluding significant modal excitations.

The IMU-based method was verified and validated via a testbed containing a linear axis and a laser-based system for measurement of the geometric axis performance. The IMU-based results typically converge within 5 µm or 15 µrad when using 10 runs for averaging, needed for the estimation of changes in geometric motion errors with test uncertainty ratios of at least 4:1. Several experiments showed that the IMU-based method is capable of resolving both low- and high-frequency error motion components. Measurement results are prone to variations in system noise, but the method incorporates averaging along with convergence testing to accommodate increased noise.

Because the method is robust for the detection of defects, appropriate diagnostic metrics based on this method can be defined to facilitate industrial applications. Such metrics would use the IMU-based data to quantify machine tool linear axis degradation, and to inform the user of the magnitude and location of wear and any violations of performance tolerances. Further tests may show the value of additional metrics for prognostic purposes to estimate the remaining useful life of linear axes performance. Finally, if the data collection and analysis are integrated within a machine controller, the process may be streamlined for the optimization of maintenance, supporting the development of self-diagnosing smart machine tools.

Embodiments of the subject matter and the operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more computers executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, workstations, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic; magneto-optical disks, optical disks, USB drives, and so on. However, a computer need not have such devices. Moreover, a computer can be embedded in another device, e.g., a mobile telephone, a personal digital assistant (PDA), a microwave oven, mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The central processing unit and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). Such interconnects may involve electrical cabling, fiber optics, or be wireless connections.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. An inertial measurement unit to determine a performance degradation of a linear axis, the inertial measurement unit comprising:
   an accelerometer that, when disposed on a motion member of the linear axis comprising the motion member and a base member:
      measures acceleration of the motion member; and
      provides a displacement of the motion member in response to movement of the motion member; and
   a rate gyroscope that:
      measures an angular rate of movement of the motion member; and
      provides a yield angle for the motion member in response to movement of the motion member,
   wherein the displacement and yield angle determine performance degradation of the linear axis based on an error in linear movement of the motion member along the base member.

2. The inertial measurement unit of claim 1, wherein the accelerometer comprises a triaxial accelerometer.

3. The inertial measurement unit of claim 2, wherein the triaxial accelerometer is a micro-electro-mechanical system (MEMS) that provides the acceleration at a spatial frequency at 0 Hz.

4. The inertial measurement unit of claim 1, wherein the rate gyroscope comprises a triaxial rate gyroscope.

5. The inertial measurement unit of claim 4, wherein the triaxial rate gyroscope is a micro-electro-mechanical system (MEMS) that provides the angular rate at a spatial frequency at 0 Hz.

6. A diagnostic apparatus to determine a performance degradation of a linear axis, the diagnostic apparatus comprising:
- a linear axis comprising:
  - a base member;
  - a motion member disposed on the base member, the motion member having substantially linear movement with respect to a first direction along the base member prior to performance degradation of the linear axis with respect to movement along the first direction; and
- an inertial measurement unit disposed on the motion member such that the inertial measurement unit moves with the motion member and comprises:
  - an accelerometer that:
    - measures acceleration of the motion member; and
    - provides a displacement of the motion member in response to movement of the motion member; and
  - a rate gyroscope that:
    - measures an angular rate of movement of the motion member; and
    - provides a yield angle for the motion member in response to movement of the motion member,
- wherein the displacement and yield angle determine performance degradation of the linear axis based on an error in linear movement of the motion member along the base member.

7. The diagnostic apparatus of claim 6, wherein the accelerometer comprises a triaxial accelerometer, and
the rate gyroscope comprises a triaxial rate gyroscope.

8. The diagnostic apparatus of claim 7, wherein:
the accelerometer produces acceleration data of the motion member, and
the rate gyroscope produces angular rate data of the motion member,
the inertial measurement unit produces inertial data comprising the acceleration data and the angular rate data.

9. The diagnostic apparatus of claim 8, further comprising:
an analyzer that:
  receives the acceleration data from the accelerometer and the angular rate data from the rate gyroscope;
  produces a straightness error based on the acceleration data; and
  produces an angular error based on the angular rate data.

10. The diagnostic apparatus of claim 9, further comprising:
a movement controller in communication with the motion member and that controls movement of the motion member in the first direction.

11. The diagnostic apparatus of claim 10, wherein the inertia data is produced by the inertial measurement unit independently of control of movement of the motion member in the first direction by the movement controller.

12. The diagnostic apparatus of claim 11, the movement controller controlling movement of the motion member at a fast speed and a slow speed such that:
the accelerometer provides a low spatial frequency of translational motion of the motion member at the fast speed, and
the accelerometer provides a high spatial frequency of translation motion of the motion member at the low speed.

13. The diagnostic apparatus of claim 12, wherein
the rate gyroscope provides a low spatial frequency of angular motion of the motion member at the fast speed, and
the rate gyroscope provides a high spatial frequency of angular motion of the motion member at the low speed.

14. The diagnostic apparatus of claim 9, further comprising:
a machine tool that comprises the linear axis,
wherein the motion member and base member in combination provide movement of a cutting tool disposed on the motion member.

15. A process for diagnosing a geometric performance of a linear axis, the process comprising:
providing the diagnostic apparatus of claim 6;
moving the motion member at a first speed in the first direction, the first speed being constant;
producing acceleration data by measuring acceleration of the motion member by the accelerometer of the inertial measurement unit;
producing angular rate data by measuring the angular rate of the motion member by the rate gyroscope of the inertial measurement unit;
integrating the acceleration data to produce the translational displacement data for the movement of the motion member;
filtering the translational displacement data to produce filtered translational displacement data versus a travel length of the motion member;
integrating the angular rate data to produce angular displacement data for the movement of the motion member; and
filtering the angular displacement data to produce filtered angular displacement data to diagnose the geometric performance of a linear axis.

16. The process of claim 15, further comprising:
moving the motion member at a second speed in the first direction,
wherein the second speed is constant, and
the second speed is different than the first speed.

17. The process of claim 15, further comprising, with respect to moving the motion member at the second speed:
producing second acceleration data by measuring acceleration of the motion member by the accelerometer of the inertial measurement unit;
producing second angular rate data by measuring the angular rate of the motion member by the rate gyroscope of the inertial measurement unit;
integrating the second acceleration data to produce second translational displacement data for the movement of the motion member;
filtering the second translational displacement data to produce second filtered translational displacement data versus a travel length of the motion member;
integrating the second angular rate data to produce second angular displacement data for the movement of the motion member; and
filtering the second angular displacement data to produce second filtered angular displacement data;
summing the first filtered translational displacement data with the second filtered translational displacement data to produce a plurality of straightness errors; and
summing the second filtered angular displacement data with the second filtered angular displacement data to produce a plurality of angular errors.

* * * * *